(12) United States Patent
Miyatake

(10) Patent No.: US 10,301,420 B2
(45) Date of Patent: May 28, 2019

(54) MODIFIED POLYASPARTIC ACID ESTER AND CURABLE RESIN COMPOSITION

(71) Applicant: KANEKA CORPORATION, Osaka-shi (JP)

(72) Inventor: Nobuo Miyatake, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 15/516,060

(22) PCT Filed: Oct. 20, 2015

(86) PCT No.: PCT/JP2015/079612
§ 371 (c)(1),
(2) Date: Mar. 31, 2017

(87) PCT Pub. No.: WO2016/063884
PCT Pub. Date: Apr. 28, 2016

(65) Prior Publication Data
US 2017/0306078 A1     Oct. 26, 2017

(30) Foreign Application Priority Data
Oct. 21, 2014  (JP) ................................. 2014-214722

(51) Int. Cl.
| | |
|---|---|
| *C08G 18/60* | (2006.01) |
| *C09D 175/04* | (2006.01) |
| *C09J 175/04* | (2006.01) |
| *C08L 51/00* | (2006.01) |
| *C08L 75/04* | (2006.01) |
| *C08F 265/06* | (2006.01) |
| *C08F 279/02* | (2006.01) |
| *C08F 283/12* | (2006.01) |
| *C08L 51/04* | (2006.01) |
| *C08L 51/08* | (2006.01) |
| *C08F 230/08* | (2006.01) |

(52) U.S. Cl.
CPC ............. *C08G 18/60* (2013.01); *C08F 265/06* (2013.01); *C08F 279/02* (2013.01); *C08F 283/124* (2013.01); *C08L 51/00* (2013.01); *C08L 51/003* (2013.01); *C08L 51/04* (2013.01); *C08L 51/08* (2013.01); *C08L 75/04* (2013.01); *C09D 175/04* (2013.01); *C09J 175/04* (2013.01); *C08F 2230/085* (2013.01); *C08L 2207/53* (2013.01)

(58) Field of Classification Search
CPC .... B05D 3/067; C09D 7/1275; C09D 175/04; C08L 2207/53; C08G 18/60
See application file for complete search history.

(56) References Cited

U.S. PATENT DOCUMENTS

| | | |
|---|---|---|
| 5,126,170 A | 6/1992 | Zwiener et al. |
| 5,236,741 A | 8/1993 | Zwiener et al. |
| 8,746,870 B2 | 6/2014 | Furukawa et al. |
| 2005/0271881 A1 | 12/2005 | Hong |
| 2007/0027263 A1* | 2/2007 | Furukawa ................ C08C 1/14 525/314 |
| 2007/0100112 A1 | 5/2007 | Sarpeshkar et al. |
| 2010/0249295 A1 | 9/2010 | Hong |
| 2010/0255279 A1 | 10/2010 | Hong |
| 2010/0256296 A1 | 10/2010 | Hong |
| 2011/0257273 A1 | 10/2011 | Yabuuchi et al. |
| 2012/0279640 A1 | 11/2012 | Hong |
| 2014/0011935 A1 | 1/2014 | Hong |
| 2014/0039119 A1 | 2/2014 | Shek Hong |

FOREIGN PATENT DOCUMENTS

| | | |
|---|---|---|
| EP | 3 006 478 | 4/2016 |
| JP | 2006-152220 A | 6/2006 |
| JP | 2009-132832 A | 6/2009 |
| JP | 2011-190286 * | 3/2010 |
| JP | 2011-190286 A | 9/2011 |
| WO | 2009/014037 A1 | 1/2009 |

OTHER PUBLICATIONS

International Search Report dated Jan. 19, 2016 in PCT/JP2015/079612 filed Oct. 20, 2015.
Carl Angeloff et al., "Two-Component Aliphatic Polyurea Coatings for High Productivity Applications", JPCL, Aug. 2002, pp. 42-47.
Deuteron GmbH Matting Agent Product Brochure, 2017, © 3-17 INT (6 pages).
Extended European Search Report dated May 29, 2018, in European patent application No. 15852518.8 (7 pages).

* cited by examiner

*Primary Examiner* — Gregory Listvoyb
(74) *Attorney, Agent, or Firm* — Oblon, McClelland, Maier & Neustadt, L.L.P.

(57) ABSTRACT

The present invention relates to a modified polyaspartic acid ester containing a polyaspartic acid ester (A) and polymer fine particles (B), wherein the polymer fine particles have a volume average particle diameter of 0.01 to 0.6 μm and an amount of the polymer fine particles is 0.5 to 70% by weight, and a curable resin composition containing a polyaspartic acid ester (A), polymer fine particles (B) having a volume average particle diameter of 0.01 to 0.6 μm, and a polyisocyanate (C).

20 Claims, No Drawings

MODIFIED POLYASPARTIC ACID ESTER AND CURABLE RESIN COMPOSITION

TECHNICAL FIELD

The present invention relates to a modified polyaspartic acid ester and a curable resin composition appropriate for paint, casting and composite material having excellent toughness and appearance.

BACKGROUND ART

Recently, a polyurea paint containing polyamine and polyisocyanate has been used widely for fast reactivity, and mechanical property, chemical resistance in a cured product, and the like. Particularly, the polyurea paint using as a polyamine polyaspartic acid ester has attracted a lot of attention in the viewpoint of appropriate curable rate, and the possibility of making the coating more thick (for example, Non Patent Document 1). Therefore, the used amount of the polyurea paint has been increased in a market. In addition, a polyurea resin obtained from a polyaspartic acid ester has attracted a lot of attention in the application other than paint in the viewpoint of good mechanical property. However, a cured product (polyurea resin) obtained from a polyaspartic acid ester has problems such as fragile and easy cracking properties. On the other hand, effective means of lowering fragile property, that is, improving toughness without greatly affecting on other property (for example, appearance) has not been found in the present state.

PRIOR ART

Non Patent Document

Non Patent Document 1: JPCL August 2002, page 42 to 47

SUMMARY OF THE INVENTION

Problem to be Solved by the Invention

The object of the present invention is to provide a modified polyaspartic acid ester and a curable resin composition appropriate for paint, casting and composite materials having excellent toughness and coating.

Means for Solving the Problems

As a result of intensive studies, the present inventors have found to effectively improve the toughness of the polyurea resin containing as a constitution a polyaspartic acid ester by using a modified polyaspartic acid ester containing a polyaspartic acid ester (A) and polymer fine particles (B) having a given particle diameter, and to solve the problem by using a curable resin composition containing a polyaspartic acid ester (A), polymer fine particles (B), and a polyisocyanate (C) as well as a cured product therefrom, to complete the present invention.

Specifically, the present invention relates to a modified polyaspartic acid ester containing a polyaspartic acid ester (A) and polymer fine particles (B), wherein the polymer fine particles (B) have a volume average particle diameter of 0.01 to 0.6 μm and an amount of the polymer fine particles (B) is 0.5 to 70% by weight.

The polymer fine particles (B) preferably have a core shell structure. The polymer fine particles (B) preferably contain a core layer of an elastic rubber containing a crosslinked polymer, and a shell layer containing a polymer graft-polymerized on the core layer.

The polymer fine particles (B) preferably have a core layer containing at least one rubber selected from the group consisting of diene rubber, (meth)acrylate rubber, and organosiloxane rubber.

The polymer fine particles (B) preferably have a shell layer grafted-polymerized on the core layer, and a monomer for forming the shell layer is selected from the group consisting of an aromatic vinyl monomer, a cyanide vinyl monomer, and a (meth)acrylate monomer.

It is preferable that the rubber content of the polymer fine particles (B) is 60 to 95% by weight, and methyl ethyl ketone insoluble content of the polymer fine particles is 85% by weight or more.

It is preferable that the polymer fine particles (B) are uniformly dispersed at the state of primary particles in the polyaspartic acid ester (A).

In addition, the present invention relates to a curable resin composition containing a polyaspartic acid ester (A), polymer fine particles (B) having a volume average particle diameter of 0.01 to 0.6 μm, and a polyisocyanate (C).

It is preferable that the curable resin composition contains a polyol (D).

In the curable resin composition, the polymer fine particles (B) preferably have a core shell structure, and preferably contain a core layer of an elastic rubber including a crosslinked polymer and a shell layer including a polymer graft-polymerized on the core layer.

In the curable resin composition, it is preferable that the polymer fine particles (B) have a core layer containing at least one rubber selected from the group consisting of diene rubber, (meth)acrylate rubber, and organosiloxane rubber.

In the curable resin composition, it is preferable that the polymer fine particles (B) have a shell layer graft-polymerized on the core layer, and a monomer for forming the shell layer is selected from the group consisting of an aromatic vinyl monomer, a cyanide vinyl monomer, and a (meth) acrylate.

In the curable resin composition, it is preferable that the rubber content of the polymer fine particles (B) is 60 to 95% by weight, and the methyl ethyl ketone insoluble content of the polymer fine particles is 85% by weight or more. It is preferable that the polymer fine particles (B) are uniformly dispersed at the state of primary particles in the curable resin composition.

It is preferable that an amount of the polymer fine particles (B) is 0.1 to 20% by weight per 100% by weight of the sum of the polyaspartic acid ester (A), the polymer fine particles (B), the polyisocyanate (C), and the polyol (D).

In the curable resin composition, it is preferable that an equivalent ratio of isocyanate group (NCO group) of the polyisocyanate (C) to a total active hydrogen-containing group of the polyaspartic acid ester (A) and the polyol (D), that is, NCO group/active hydrogen-containing group is 0.80 to 3.00. It is preferable that an amount of the polyol (D) is 0 to 200 parts by weight per 100 parts by weight of the polyaspartic acid ester (A).

In addition, the present invention relates to a cured product obtained by curing the curable resin composition.

Effect of the Invention

The cured product obtained by curing the curable resin composition containing the modified polyaspartic acid ester, polymer fine particles, and polyisocyanate exhibits excellent toughness and appearance.

MODE FOR CARRYING OUT THE INVENTION

The present invention includes a modified polyaspartic acid ester (hereinafter referred to as master batch in some cases) containing a polyaspartic acid ester (A) and polymer fine particles (B), and a curable resin composition containing the modified polyaspartic acid ester, a polyisocyanate (C) and a polyol (D) as needed. In the modified polyaspartic acid ester and the curable resin composition, the polymer fine particles are dispersed (preferably primarily dispersed), so that the impact resistance and the appearance of the coating can be improved. In the present invention, the modified polyaspartic acid ester means a composition for mixing the polyaspartic acid ester and polymer fine particles.

<Modified Polyaspartic Acid Ester>

The modified polyaspartic acid ester of the present invention contains a polyaspartic acid ester (A) and polymer fine particles (B), wherein the polymer fine particles (B) have a volume average particles diameter of 0.01 to 0.6 μm, and an amount of the polymer fine particles (B) is 0.5 to 70% by weight.

The polymer fine particles (B) are used in the modified polyaspartic acid ester of the present invention, and are uniformly dispersed at the state of primary particles. In the case where the polymer fine particles are stably dispersed at the state of primary particles, at least 0.5 g of modified polyaspartic acid ester is mixed with 10 g of methyl ethyl ketone (MEK), and the precipitates of aggregated polymer fine particles are not generated. The modified polyaspartic acid ester may be used in an amount of 1 g in the case where the precipitates of aggregated polymer fine particles are not generated. On the contrary, in the case where the precipitates of aggregated polymer fine particles are generated in the 0.5 g of the modified polyaspartic acid ester, the polymer fine particles (B) and the polyaspartic acid ester (A) are incompatible, and the stability of the dispersion becomes poor.

<Polyaspartic Acid Ester (A)>

The polyaspartic acid ester (A) used in the present invention is preferably secondary aliphatic polyamine represented by the following formula. The polyaspartic acid ester mildly reacts with a polyisocyanate (C) as set forth below compared with other an aliphatic amine and an aromatic amine, so that the reaction is easily controlled.

[Chemical formula 1]

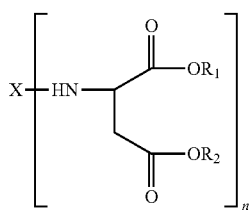

(1)

In the above formula, $R_1$ and $R_2$ are the same or different, and $R_1$ and $R_2$ represent an organic group having 1 to 18 of carbon atoms, X is a divalent aliphatic hydrocarbon group having 6 to 30 of carbon atoms in a cyclic or linear, and n is an integer of at least 2.

It is preferable that $R_1$, $R_2$, and X are inert to an isocyanate group of the polyisocyanate (C) in the viewpoint of appropriate reactivity.

The organic group of $R_1$ and $R_2$ is preferably at least one group selected from the group consisting of an aliphatic hydrocarbon group, an alicyclic hydrocarbon group, and an aromatic hydrocarbon group.

The number of the carbon atoms of $R_1$ and $R_2$ is preferably 1 to 16, more preferably 1 to 14, even preferably 1 to 12, even more preferably 1 to 10, particularly preferably 1 to 8, and most preferably 1 to 6.

The aliphatic hydrocarbon group includes a linear aliphatic hydrocarbon group such as methyl group, ethyl group, propyl group, n-butyl group, pentyl group, hexyl group, heptyl group, octyl group, nonyl group, decyl group, undecyl group, dodecyl group, tridecyl group, tetradecyl group, pentadecyl group, and hexadecyl group; a branched aliphatic hydrocarbon group such as isopropyl group, isobutyl group, sec-butyl group, tert-butyl group, isopentyl group, neopentyl group, and 2-ethylhexyl group.

The alicyclic hydrocarbon group includes cyclopropyl group, cyclobutyl group, cyclopentyl group, cyclohexyl group, cycloheptyl group, cyclooctyl group, cyclononyl group, cyclodecyl group, cycloundecyl group, cyclododecyl group, cyclotridecyl group, cyclotetradecyl group, cyclopentadecyl group, cyclohexadecyl group, and the like.

The aromatic hydrocarbon group includes phenyl group, o-tolyl group, m-tolyl group, p-tolyl group, xylyl group, mesityl group, o-cumenyl group, m-cumenyl group, p-cumenyl group, naphtyl group, and the like.

The aliphatic hydrocarbon group, the alicyclic hydrocarbon group, the aromatic hydrocarbon group may have optionally a substituent. The substituent may be a halogen atom such as chorine, fluorine, bromide, a hydroxyl group, an amino group, an alkyl group such as methyl group, ethyl group, an aryl group such as phenyl group, and the like. The number of the substituent may be one or two or more, and two or more substituents may be the same or different.

Among these, the organic group of $R_1$ and $R_2$ is preferably the aliphatic hydrocarbon group, more preferably the linear or branched aliphatic hydrocarbon group, even preferably methyl group, ethyl group, n-butyl group, or 2-ethyl hexyl group, and particularly preferably methyl group or ethyl group, and most preferably ethyl group.

$R_1$ and $R_2$ are preferably the same, and more preferably ethyl group.

As X, the divalent aliphatic hydrocarbon group in the cyclic or linear chain includes a divalent aliphatic hydrocarbon group in the linear chain such as n-hexylene group, n-heptylene group, n-octylene group, n-nonylene group, n-decylene group; a divalent aliphatic hydrocarbon group in the cyclic chain such as cyclohexane-1,2-diyl group, cyclohexane-1,3-diyl group, cyclohexane-1,4-diyl group, cyclopentane-1,3-diyl group, methylenebis(cyclohexane-1,4-diyl) group (dicyclohexylmethane group), (dimethylmethylene)bis(cyclohexane-1,4-diyl) group (dimethyldicyclohexylmethane group).

The X of the aliphatic hydrocarbon group may be optionally substituted. The substituent may be a halogen atom such as chorine, fluorine, bromide, a hydroxyl group, an amino group, an alkyl group such as methyl group, ethyl group, an aryl group such as phenyl group. The number of the substituent may be one or two or more, and two or more substituents may be the same or different.

The carbon atoms of X are preferably 6 to 20, more preferably 6 to 18, even preferably 6 to 16, particularly preferably 6 to 14, and most preferably 8 to 14.

Among these, X is preferably the divalent aliphatic hydrocarbon group in the cyclic chain, and more preferably methylene bis (cyclohexane-1,4-diyl) group, or (dimethylmethylene)bis (cyclohexane-1,4-diyl) group.

The preferred concrete examples having X and the amine may be a group obtained by removing an amino group from 1-amino-3,3,5-trimethyl-5-aminomethylcyclohexane, 4,4'-diaminodicyclohexylmethane, 3,3'-dimethyl-4,4'-diaminodicyclohexylmethane, hexahydro-2,4- and/or -2,6-diamino toluene, isomerized C-monomethyldiaminodicyclohexylmethane and 3(4)-aminomethyl-1-methylcyclohexylamine.

n is preferably 2 in the viewpoint of the polyaspartic acid ester of the polyamine.

The polyaspartic acid ester (A) can be synthesized by known synthesized methods, for example, methods of Examples described in U.S. Pat. No. 5,126,170. In addition, commercially available products such as Desmophen (registered trademark) NH1220, Desmophen (registered trademark) NH1420, Desmophen (registered trademark) NH1520, manufactured by Covestro (formerly Bayer MaterialScience) can be utilized.

<Polymer Fine Particles (B)>

The polymer fine particles (B) of the present invention are used for improving the toughness and the impact resistance of the cured product obtained by curing the curable resin composition.

The polymer fine particles (B) have a volume average particle diameter of 0.01 to 0.6 µm, preferably 0.03 to 0.5 µm, and more preferably 0.05 to 0.4 µm. A method for preparing polymer fine particles (B) having the above volume average particle diameter is appropriately emulsion polymerization. In the case where the volume average particle diameter of the polymer fine particles is much small or much large, it is difficult to prepare economically and industrially the polymer fine particles. The volume average particle diameter of the polymer fine particles can be measured by using Microtrack UPA 150 (manufactured by Nikkiso Co., Ltd.).

The polymer fine particles (B) are contained in an amount of 0.5 to 70% by weight, preferably 1 to 60% by weight, and more preferably 5 to 50% by weight of the modified polyaspartic acid ester. When the amount thereof is much small, effects from polymer fine particles are hardly obtained. On the other hand, when the amount thereof is much large, the modified polyaspartic acid ester has a high viscosity, so that the handling of the polyaspartic acid ester becomes difficult.

The amount of the polymer fine particles is preferably from 0.1 to 20% by weight, more preferably from 1 to 15% by weight, and even preferably 1 to 10% by weight per 100% by weight of the sum of a polyaspartic acid ester (A), polymer fine particles (B), a polyisocyanate (C), and a polyol (D) if necessary. In the case where the amount of the polymer fine particles is much small, effects of improving toughness tend to become small. On the other hand, when the amount of the polymer fine particles is much large, the curable resin composition tends to have a high viscosity.

The polymer fine particles (B) preferably have a Methyl Ethyl Ketone (MEK) insoluble content. The MEK insoluble content of the polymer fine particles (B) is preferably from 85% to 100% by weight, more preferably from 90% to 99.5% by weight, even preferably 95% by weight or more, particularly preferably 97% by weight or more, and most preferably 98% by weight or more. In the case where the MEK insoluble content is less than 85% by weight, the modified polyaspartic acid ester tends to increase a viscosity. In the specification, a method for calculating MEK insoluble content of the polymer fine particles (B) is as follows.

2 g of the powder or film of the polymer fine particles is immersed in 100 g of methyl ethyl ketone (MEK) at 23° C. for 24 hours. Thus, obtained MEK insoluble content is collected to dry and weigh, and a weight ratio (%) to a weight of the polymer fine particles used in the measurement is calculated as a MEK insoluble content. The structure of the polymer fine particles (B) is not particularly limited, and the polymer fine particles (B) preferably have a core shell structure, and more preferably have a core shell structure in the two or more layers. In the specification, the polymer fine particles are referred to as a core shell polymer in some cases.

The polymer fine particles (B) preferably contain a core layer of an elastic rubber including a crosslinked polymer and a shell layer including a polymer grafted polymerized on the core layer. The shell polymer is chemically bonded to the core polymer. A monomer used in the formation of the shell layer is graft-polymerized on the core polymer for forming the core layer, and the shell layer covers on a part or the whole of the surface of the core layer.

The core layer is preferably a crosslinked polymer having the rubber property in order to improve the toughness of the cured product formed from the curable resin composition. In order to exhibit the rubber property in the core layer, the core layer has a glass transition temperature of preferably 0° C. or less, more preferably −20° C. or less, and particularly preferably −40° C. or less. In the specification, the glass transition temperature is referred to as Tg in some case. Tg can be measured with dynamic viscoelastic measuring method or differential scanning calorimetry.

A polymer capable of forming the core layer having the rubber property includes a natural rubber, a rubber polymer (diene rubber, (meth)acrylate rubber) comprising from 50 to 100% by weight of at least one monomer (first monomer) selected from a diene monomer (conjugated diene monomer) and (meth)acrylate monomer and from 0 to 50% by weight of other polymerizable vinyl monomer (second monomer), an organosiloxane rubber, or combination thereof. It is preferable that the core layer is the diene rubber polymerized with the diene monomer in the view of highly improving toughness of the cured product. In the case where the balance between the toughness, weather resistance, and economy is required, the core layer is preferably the (meth) acrylate rubber (acrylic rubber). In the case where the toughness such as the crack resistance and the impact resistance at lower temperature is improved without lowering the heat resistance in the cured product, it is preferable that the core layer is the organosiloxane rubber (polysiloxane polymer). In the present invention, (meth) acrylate means acrylate and/or methacrylate.

A monomer (conjugated diene monomer) for constituting the diene rubber used in the core layer includes 1,3-butadiene, isoprene, 2-chrolo-1,3-butadiene, 2-methyl-1,3-butadiene and the like. These may be used individually or in combination of two or more monomers.

From the view of highly improving toughness, a butadiene rubber polymerized with 1,3-butadiene, a butadiene-styrene rubber of a copolymer polymerized with 1,3-butadiene and styrene, or a butadiene-acrylate rubber of a copolymer polymerized with 1,3-butadiene and butylacrylate or 2-ethylhexylacrylate is preferable, and a butadiene rubber is more preferable. In addition, a butadiene-styrene rubber is more preferable in the view of improving the transparency of the cured product obtained from the adjustment of refractive index and improving the balance between the appearance and the toughness. In addition, butadiene-acrylate rubber is preferable, because the weather resistance and the heat resistance are improved by decreasing the content of butadiene having double bonds in the butadiene-acrylate rubber from the introduction of the acrylate.

A monomer for constituting the (meth)acrylate rubber used in the core layer includes alkyl (meth) acrylates such as methyl(meth)acrylate, ethyl(meth)acrylate, butyl(meth)acrylate, 2-ethylhexyl(meth)acrylate, octyl(meth)acrylate, dodecyl(meth)acrylate, stearyl(meth)acrylate, behenyl (meth)acrylate; aromatic ring containing (meth)acrylates such as phenoxy ethyl(meth)acrylate, benzyl(meth)acrylate; hydroxyalkyl(meth)acrylates such as 2-hydroxyethyl(meth)acrylate, 4-hydroxybutyl(meth)acrylate; glycidyl group containing (meth)acrylates such as glycidyl (meth)acrylate and glycidyl alkyl (meth)acrylate; alkoxyalkyl(meth)acrylates; allyl group containing (meth)acrylates such as allyl(meth)acrylate, and allylalkyl(meth)acrylate; multifunctional (meth)acrylates such as monoethylene glycol di(meth)acrylate, triethylene glycol di(meth)acrylate, tetraethylene glycol di(meth)acrylate and the like. These (meth)acrylate monomers may be used individually or in combination of two or more (meth)acrylate monomers. The monomer is preferably alkyl (meth)acrylates, hydroxyalkyl(meth)acrylates, allyl (meth)acrylates, more preferably ethyl (meth)acrylate, butyl (meth)acrylate, 2-ethylhexyl (meth)acrylate, and allyl (meth)acrylate.

A vinyl monomer (second monomer) polymerizable with the first monomer includes vinyl arenes such as styrene, α-methylstyrene, monochlorostyrene, dichlorostyrene; vinyl carboxylic acids such as acrylic acid, methacrylic acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene. The vinyl monomer may be used individually or in combination of two or more vinyl monomers. The monomer is especially preferably styrene.

The organosiloxane rubber for constituting the core layer includes a polysiloxane polymer containing alkyl- or aryl-2-substituted silyloxy units such as dimethyl silyloxy, diethyl silyloxy, methylphenyl silyloxy, diphenyl silyloxy, dimethyl silyloxy-diphenyl silyloxy, or a polysiloxane polymer containing alkyl- or aryl-1-substituted silyloxy units such as a polysiloxane polymer having an organohydrogen silyloxy in which a part of alkyl in the side chain is substituted with hydrogen. The organosiloxane rubber may be used individually or in combination of two or more polymers. A combined rubber containing the organosiloxane rubber and (meth)acrylate rubber may be used. Among these, the organosiloxane rubber having dimethyl silyloxy or methylphenyl silyloxy, or the combined rubber containing dimethylsiloxane/butylacrylate is preferred in the view of giving the heat resistance to the cured product, and the dimethylsiloxane rubber or the combined rubber containing dimethylsiloxane/butylacrylate are most preferred in the view of easy availability and the economy.

In the embodiment that the core layer is formed with the organosiloxane rubber, the siloxane rubber is contained in an amount of preferably not less than 10% by weight per 100% by weight of the core layer, so as not to impair the heat resistance of the cured product.

In the core layer, it is preferable that a crosslinked structure is introduced in the polymer obtained by polymerizing the above monomer(s) in the view of retaining the dispersion stability of the polymer fine particles in the polyaspartic acid ester or the curable resin composition. As methods for introducing the crosslinked structure, a conventional method can be used. A method for introducing the crosslinked structure to the polymer polymerized with the above monomer(s) includes a method for adding to a monomer for forming a polymer a crosslinking monomer such as a multifunctional monomer and a mercapto group-containing compound and the like, and polymerizing these. In addition, a method for introducing the crosslinked structure to the organosiloxane polymer includes a method for partly combining a multifunctional alkoxysilane compound at polymerization, a method for introducing a reactive group such as a vinyl group, a mercapto group, a methacryloyl group and the like to the organosiloxane polymer, and adding a polymerizable vinyl monomer or organic peroxide to subjecting to radical reaction, and a method for adding a crosslinking monomer such as a multifunctional monomer and a mercapto group-containing compound to the organosiloxane polymer and polymerizing these.

The multifunctional monomer does not contain butadiene, and includes allyl group-containing (meth)acrylate such as allyl(meth)acrylate, allylalkyl(meth)acrylate; allyloxyalkyl (meth)acrylate; multifunctional(meth)acrylate having two or more (meth)acrylic groups such as (poly)ethylene glycol di(meth)acrylate, butanediol di(meth)acrylate, ethylene glycol di(meth)acrylate, triethylene glycol di(meth)acrylate, tetraethylene glycol di(meth)acrylate; diallyl phthalate, triallylcyanurate, triallylisocyanurate, divinylbenzene and the like. Allyl(meth)acrylate, triallyl isocyanurate, butanediol di(meth)acrylate, and divinyl benzene are particularly preferable. The core layer has a glass transition temperature of preferably more than 0° C., more preferably 20° C. or more, even preferably 50° C. or more, particularly preferably 80° C. or more, and most preferably 120° C. or more in the case where the balance between the toughness and the elastic modulus (rigidity) is required in the cured product.

A polymer for forming the core layer in which Tg is greater than 0° C. and the decrease of rigidity of the cured product obtained can be controlled includes a polymer composed of 50 to 100% by weight (preferably 65 to 99% by weight) of at least one kind of a monomer having Tg greater than 0° C. in homopolymer and 0 to 50% by weight (preferably 1 to 35% by weight) of at least one kind of a monomer having Tg less than 0° C. in homopolymer.

When Tg of the core layer is greater than 0° C., it is preferable that the crosslinked structure is introduced in the core layer. Tg increases by the introduction of the crosslinked structure. The method of introducing the crosslinked structure includes the method mentioned above.

A monomer having Tg greater than 0° C. in the homopolymer includes those containing the following one or more monomers, but is not particularly limited. The monomer includes an unsubstituted aromatic vinyl compound such as styrene, 2-vinylnaphthalene; a substituted aromatic vinyl compound such as α-methyl styrene; an alkyl-substituted aromatic vinyl compound such as 3-methylstyrene, 4-methylstyrene, 2,4-dimethylstyrene, 2,5-dimethylstyrene, 3,5-dimethylstyrene, 2,4,6-trimethylstyrene; an alkoxy-substituted aromatic vinyl compound such as 4-methoxystyrene, 4-ethoxy styrene; a halogenated aromatic vinyl compound such as 2-chlorostyrene, 3-chlorostyrene; an ester-substituted aromatic vinyl compound such as 4-acetoxystyrene; a hydroxyl-substituted aromatic vinyl compound such as 4-hydroxystyrene; a vinyl ester such as vinyl benzoate, vinylcyclohexanoate; a halogenated vinyl compound such as vinylchloro; an aromatic monomer such as acenaphthalene, indene; an alkyl(meth)acrylate such as methyl(meth)acrylate, ethyl(meth)acrylate, isopropyl(meth)acrylate; an aromatic (meth)acrylate such as phenyl(meth)acrylate; a (meth)acrylate such as isobornyl (meth)acrylate, trimethylsilyl (meth)acrylate; a (meth)acrylic monomer containing methacrylic acid derivative such as methacrylonitrile; an acrylic acid ester such as isobornylacrylate, tert-butylacrylate; an acrylic monomer containing acrylic acid derivative such as acrylonitrile. Further, the monomer includes a monomer having Tg greater than 120° C. such as acrylamide, isopropylacrylamide, N-vinylpyrrolidone, isobornyl methacrylate, dicyclopentanylmethacrylate, 2-methyl-2-adamantylmethacrylate, 1-adamantylacrylate and 1-adamantylmethacrylate.

In the present invention, the core layer may be composed of monolayer in some cases, and may be composed of multilayers. In the case where the core layer is composed of multilayer, the polymer composition of each layer may be different each other.

The core layer may be a core layer of two layers having a second layer polymerized with a different polymer composition on the surface of the first core layer, and a core layer of three layers having a third layer polymerized with a different polymer composition on the surface of the core layer having two layers. When the second core layer of the outermost layer in the core layer having two layer and the third core layer of the outermost layer in the core layer having three layers are a polymer obtained by polymerizing as a main component a multifunctional monomer such as triallylisocyanurate, there is a merit that a shell polymer as set forth below is easily grafted-polymerized. On the contrary, there is a demerit that the manufacture of the core layer having a multilayer structure becomes complicated.

The rubber content of the polymer fine particles (B) is preferably 60 to 95% by weight, more preferably 70 to 95% by weight, and even preferably 70 to 90% by weight in the viewpoint of the impact resistance. When the rubber content is beyond the above range, the impact resistance is decreased or the dispersibility of the polymer fine particles is deteriorated in some cases.

The rubber content can be calculated from an amount of used monomers and reaction rate. In addition, the rubber content can be measured with absorbance ratio in spectrum from infrared spectroscopy. In the case where the rubber content is not measured with infrared spectroscopy, the rubber content can be measured by combining heat degradation and/or alkaline degradation-gas chromatography mass spectrometry.

The amount of the core layer in the polymer fine particles is preferably from 60 to 95% by weight, more preferably from 70 to 95% by weight, and even preferably 75 to 90% by weight, per 100% by weight of the whole polymer fine particles. In the case where the amount of the core layer is larger or smaller, the viscosity of the modified polyaspartic acid ester is increased to deteriorate the handling.

The shell layer or the shell polymer existing at outermost of the polymer fine particles (B) controls the compatibility between the polymer fine particles (B) and the polyaspartic acid ester (A) of the present invention. The shell polymer contributes to effectively disperse the core shell polymer in the modified polyaspartic acid ester and the cured product obtained by curing the curable resin composition.

The shell polymer for forming the shell layer is preferably grafted on the core layer. More precisely, it is preferable that a monomer used in the formation of the shell layer is graft-polymerized on the core polymer for forming the core layer, and the shell polymer is chemically bonded to the core polymer.

It is preferable that the shell polymer is formed by graft-polymerizing the monomer for forming the shell layer under the presence of the core polymer, and a part or all of the core polymer is covered with the shell polymer. Such a polymerization can be carried out by adding a monomer for constituting the shell polymer to a latex containing the core polymer prepared in the state of an aqueous latex, and polymerizing the monomer and the core polymer.

The monomer for forming the shell layer is preferably an aromatic vinyl monomer, a (meth) acrylate monomer, a cyanide vinyl monomer, and more preferably an aromatic vinyl monomer, a (meth) acrylate monomer, in the view of the compatibility and the dispersibility of the polymer fine particles (B) in the curable resin composition. The monomer is even preferably a (meth) acrylate monomer in the viewpoint of the reactive rate.

The monomer for forming the shell layer preferably contains a monomer having one or more reactive groups selected from the group consisting of an epoxy group, an oxetane group, a hydroxyl group, an amino group, an imide group, a carboxylic acid group, a carboxylic acid anhydride group, a cyclic ester, a cyclic amide group, a benzoxazine group, and a cyanate ester group in the view of the control of the dispersion state of the polymer fine particles (B) in the cured product. The monomer for forming the shell layer is more preferably a monomer having a hydroxyl group. The monomer having one or more reactive groups can control a variation of the dispersion state because the monomer joins in the reaction of the polyaspartic acid ester (A) with the polyisocyanate (C) to form a chemical bond.

The monomer having a hydroxyl group is contained in an amount of preferably from 1 to 40% by weight, and more preferably from 2 to 30% by weight, per 100% by weight of the monomer for forming the shell layer. When the amount of the monomer having a hydroxyl group is much smaller or large in the monomers for forming the shell layer, the polyaspartic acid ester and the curable resin composition tends to decrease the dispersibility of the polymer fine particles.

In addition, when a multifunctional monomer having two or more double bonds is used as a monomer for forming the shell layer, the cross-linked structure is introduced in the shell layer. Thus, a multifunctional monomer having two or more double bonds is preferably used as a monomer for forming the shell layer because the swelling of the core shell polymer is prevented in the polyaspartic acid ester, or the viscosity of the modified polyaspartic acid ester and the curable resin composition becomes lower to improve the handling. On the other hand, it is preferable that a multifunctional monomer having two or more double bonds is not used as a monomer for forming the shell layer in order to maximize effects for improving the toughness of the cured product.

The multifunctional monomer is contained in an amount of preferably from 0.5 to 10% by weight, and more preferably from 1 to 5% by weight, per 100% by weight of a monomer for forming the shell layer.

Concrete example of the aromatic vinyl monomer includes styrene, α-methyl styrene, p-methyl styrene, divinyl benzene and the like.

Concrete example of the cyanide vinyl monomer includes acrylonitrile, and methacrylonitrile.

The concrete example of the (meth)acrylate monomer includes methyl(meth)acrylate, ethyl(meth)acrylate, butyl (meth)acrylate, and the like.

The concrete example of the monomer having a hydroxyl group includes hydroxyethyl(meth)acrylate, hydroxybutyl (meth)acrylate, and the like.

Concrete example of the monomer having an epoxy group includes glycidyl (meth) acrylate, 4-hydroxy butyl(meth)acrylate glycidyl ether, allyl glycidyl ether, and the like. Particularly, glycidyl (meth)acrylate is preferable in the view of the stability and the reactivity.

Concrete example of the monomer having an oxetane group includes (3-ethyloxetane-3-yl)methylacrylate.

Concrete example of the monomer having an amino group includes dimethylaminoethyl(meth)acrylate, diethylaminoethyl(meth)acrylate, and the like.

Concrete example of the monomer having an imide group includes a succinimide monomer such as N-(meth)acryloyloxymethylene succinimide, N-(meth)acryloyl-6-oxyhexamethylene succinimde, N-(meth)acryloyl-8-oxyhexamethylene succinimide; a maleimide monomer such as N-cyclohexyl maleimide, N-isopropyl maleimide, N-lauryl maleimide, N-phenylmaleimide.

Concrete example of the monomer having a carboxylic acid group includes acrylic acid, methacrylic acid, crotonic acid, and the like.

Concrete example of the monomer having a carboxylic acid anhydride group includes maleic anhydride, acrylic anhydride, and the like.

Concrete example of the monomer having a cyclic ester includes gamma-butyrolactone-2-yl acrylate and the like.

Concrete example of the monomer having a cyclic amide includes gamma-butyrolactum-2-yl acrylate and the like.

Concrete example of the monomer having a benzoxazine group includes oxazolidine having vinyl group or (meth) acrylic group.

Concrete example of the multifunctional monomer having two or more double bonds is exemplified by the same monomer as the above-mentioned multifunctional monomer. The multifunctional monomer is preferably allylmethacrylate, and triallylisocyanurate.

In the present invention, the shell layer is preferably a polymer polymerized with the monomer for forming the shell layer, for example, styrene of from 0 to 85% by weight (preferably from 1 to 80% by weight, the amount of styrene may be 50% by weight or less), butylacrylate of from 0 to 60% by weight (preferably 0% by weight), methylmethacrylate of from 0 to 90% by weight (preferably from 1 to 60% by weight, more preferably 1 to 30% by weight), and hydroxybutyl acrylate of from 1 to 40% by weight (preferably from 1 to 30% by weight). By this, a given toughness and mechanical property can be exhibited in the balanced manner.

The shell layer may be formed with other monomer in addition to the above monomers.

The amount of the shell layer in the polymer fine particles (B) is preferably from 5 to 40% by weight, more preferably from 5 to 30% by weight, even preferably from 7 to 25% by weight, and particularly preferably from 10 to 18% by weight, per 100% by weight of the polymer fine particles. In the case where the amount of the shell layer is too large or too small, the modified polyaspartic acid ester tends to highly increase the viscosity, so that the handling of the modified polyaspartic acid ester is deteriorated.

<Method for Preparing Polymer Fine Particles (B)>
(Method for Preparing Core Layer)

In the case where the polymer for forming the core layer as the constituent of the polymer fine particles (B) used in the present invention is polymerized with at least one monomer (first monomer) selected from the diene monomer (conjugated diene monomer) and (meth) acrylate monomer, the core layer can be prepared according to emulsion polymerization, suspension polymerization, micro-suspension polymerization and the like, and methods described in WO2005/028546 can be used.

In the case where the polymer for forming the core layer comprises the organosiloxane polymer, the core layer can be prepared by emulsion polymerization, suspension polymerization, micro-suspension polymerization and the like, and methods described in EP1338625 can be used.

(Method of Preparing Shell Layer)

The shell layer can be formed by polymerizing a monomer for forming the shell layer with a known radical polymerization. In the case where a polymer fine particle precursor constituting the core layer is obtained as an emulsion, it is preferable that the polymerization of the monomer for forming the shell layer is carried out with the emulsion polymerization, and the shell layer can be prepared according to methods of WO 2005/028546.

The following dispersants can be mentioned as examples of emulsifiers (dispersants) usable in the emulsion polymerization: various acids including alkyl or aryl sulfonic acids such as dioctylsulfosuccinic acid and dodecylbenzenesulfonic acid, alkyl or arylether sulfonic acids, alkyl or arylsulfuric acids such as dodecylsulfuric acids, alkyl or arylether sulfuric acids, alkyl or aryl-substituted phosphoric acids, alkyl or arylether-substituted phosphoric acids, N-alkyl or arylsarcosinic acids such as dodecylsarcosinic acid, alkyl or arylcarboxylic acids such as oleic acid and stearic acid, and alkyl or arylether carboxylic acids, and anionic emulsifiers (dispersants) such as alkali metal salts or ammonium salts of these acids; nonionic emulsifiers (dispersants) such as alkyl or aryl-substituted polyethylene glycols; and derivatives of polyvinyl alcohol, alkyl-substituted celluloses, polyvinyl pyrrolidone, and polyacrylic acid. Any of these emulsifiers (dispersants) may be used individually, or two or more of these may be used in combination.

The amount of the emulsifier (dispersant) is preferably as small as possible, but the dispersion stability of the polymer fine particles (B) in the aqueous latex should be secured. The emulsifier (dispersant) preferably has as high water solubility as possible. An emulsifier (dispersant) having high water solubility can be easily washed out with water, and thus its bad influence on the final cured product can be easily avoided.

As known initiators of emulsion-polymerization, thermal decomposition initiator such as 2,2'-azobisisobutylonitrile, organic peroxide, hydrogen peroxide, potassium persulphate, ammonium persulfate can be used. In the present invention, the organic peroxide is particularly preferable.

The organic peroxides include t-butylperoxy isopropyl carbonate, p-menthane hydroperoxide, cumene hydroperoxide, dicumyl peroxide, t-butyl hydroperoxide, di-t-butyl peroxide, di-t-hexyl peroxide, and the like. Among these, the organic peroxides preferably have a 10 hr half-life temperature of 120° C. or more, and a 10 hr half-life temperature is referred to as $T_{10}$. The organic peroxides having a 10 hr half-life temperature of 120° C. or more are preferably di-t-butyl peroxide having $T_{10}$ of 124° C., p-menthane hydroperoxide having $T_{10}$ of 128° C., cumene hydroperoxide having $T_{10}$ of 158° C., and t-butyl hydroperoxide having $T_{10}$ of 167° C. in the view of high MEK insoluble content of the polymer fine particles.

In addition, redox type initiators of peroxides such as organic peroxides in combination with reducing agents such as sodium formaldehyde sulfoxylate, glucose as needed and transition metal salts such as ferrous sulfate as needed, chelating agents such as disodium ethylenediaminetetraacetate as needed, further phosphorus-containing compounds such as sodium pyrophosphate as needed can also be used.

In the case of polymerization using a redox type initiator, it is possible to carry out the polymerization even at a low temperature at which the organic peroxide does not cause substantially thermal decomposition and to set the polymerization temperature in a wide range, and therefore such a polymerization is preferable.

The amount of the reducing agent/transition metal salt/chelating agent when a thermal decomposition initiator or a redox-type initiator is used can be used in the range known in the art.

Also, a known chain transfer agent can be used. The chain transfer agent may be those used in the conventional emulsion polymerization, and is not particularly limited.

Concrete examples of the chain transfer agent include t-dodecyl mercaptan, n-octylmercaptan, n-tetradecylmercaptan, n-hexylmercaptan, and the like.

The conditions to be applied in the polymerization, such as polymerization temperature, pressure, and deoxidation, are those known in the art.

<Method for Manufacturing Modified Polyaspartic Acid Ester>

Various methods can be used as a method of dispersing polymer fine particles (B) in the state of primary particles in the polyaspartic acid ester (A). For example, such a method includes a method of bringing polymer fine particles obtained in the state of an aqueous latex, into contact with the polyaspartic acid ester (A) and then removing unnecessary components such as water and the like, and a method of once extracting polymer fine particles with an organic solvent and then mixing the extract with the polyaspartic acid ester (A) to remove the organic solvent. However, it is preferred to use the method described in International Publication WO 2005/028546. Specifically, such a method includes a first step of mixing an aqueous latex containing polymer fine particles (B) (in particular, a reaction mixture after production of the polymer fine particles by emulsion polymerization) with an organic solvent having a solubility of 5% to 40% in water at 20° and further mixing the mixture with an excess of water to agglomerate the polymer fine particles (B); a second step of separating and collecting the agglomerated polymer fine particles (B) from the liquid phase and mixing the polymer fine particles with an organic solvent again to obtain an organic solvent solution containing the polymer fine particles (B); and a third step of further mixing the organic solvent solution with the polyaspartic acid ester (A) and then distilling off the organic solvent, and this method is preferably used for the preparation of the composition.

The polyaspartic acid ester (A) is preferably a liquid at 23° C. because the third step is easily performed. The term "liquid at 23° C." means that the softening point is 23° C. or less and means that the polyaspartic acid ester (A) has a fluidity at 23° C.

<Curable Resin Composition>

The curable resin composition of the present invention is a mixture containing a polyaspartic acid ester (A), polymer fine particles (B), and a polyisocyanate (C). The cured product obtained by curing the curable resin composition has excellent toughness and appearance.

It is preferable that the polymer fine particles (B) are uniformly dispersed at the state of primary particles in the curable resin composition.

The wording "primary particles" means that each of polymer fine particles is not aggregated each other, each of polymer fine particles is independently dispersed in the curable resin composition (and modified polyaspartic acid ester).

The primary dispersion of the polymer fine particles may be determined by observing a cured product of the curable resin composition using an electron microscopy and the like, and examining the dispersed state of the polymer fine particles.

Further, in the present invention, the curable resin composition preferably contains a polyol (D). The cured product obtained by curing the curable resin composition has more excellent toughness.

Further, the curable resin composition may contain other compounded agent if necessary.

<Polyisocyanate (C)>

The polyisocyanate (C) is used in the curable resin composition of the present invention. The polyisocyanate (C) may be used individually or in combination of two or more polyisocyanates. The polyisocyanate (C) is an essential component for reacting the polyaspartic acid ester (A) and the polymer fine particles (B), and forming a polyurea or a polyurethane of the curable resin composition. Conventionally known polyisocyanate compounds are used as the polyisocyanate (C).

The polyisocyanate (C) includes diisocyanate compound, polyisocyanate compound other than diisocyanate compound. The diisocyanate includes, for example, an aliphatic diisocyanate, an alicyclic diisocyanate, an araliphatic diisocyanate, an aromatic diisocyanate and the like. The concrete examples of these are exemplified below.

The aliphatic diisocyanate compound includes trimethylene diisocyanate, tetramethylene diisocyanate, hexamethylene diisocyanate, pentamethylene diisocyanate, 1,2-propylene diisocyanate, 1,2-butylene diisocyanate, 2,3-buthylene diisocyanate, 1,3-butylene diisocyanate, 2,4,4- or 2,2,4-trimethylhexamethylene diisocyanate, 2,6-diisocyanate methyl caproate and the like.

Alicyclic diisocyanate compound includes 1,3-cyclopentene diisocyanate, 1,4-cyclohexane diisocyanate, 1,3-cyclohexane diisocyanate, 3-isocyanate methyl-3,5,5-trimethylcyclohexylisocyanate, 4,4'-methylenebis(cyclohexylisocyanate), methyl-2,4-cyclohexane diisocyanate, methyl-2,6-cyclohexane diisocyanate, 1,3-bis(isocyanatemethyl)cyclohexane, 1,4-bis(isocyanatemethyl)cyclohexane, isophorone diisocyanate and the like.

The araliphatic diisocyanate compound includes 1,3- or 1,4-xylylendiisocyanate or a mixture thereof, ω, ω'-diisocyanate-1,4-diethyl benzene, 1,3- or 1,4-bis (1-isocyanate-1-methylethyl)benzene or a mixture thereof and the like.

The aromatic diisocyanate compound includes m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, 4,4'-diphenyl ether diisocyanate and the like.

The polyisocyanate compound other than diisocyanate compound includes, for example, an aliphatic polyisocyanate, an alicyclic polyisocyanate, an araliphatic polyisocyanate, an aromatic polyisocyanate and the like. The concrete examples of these are exemplified below.

The aliphatic polyisocyanate compound includes lysine ester triisocyanate, 1,4,8-triisocyanate octane, 1,6,11-triisocyanate undecane, 1,8-diisocyanate-4-isocyanate methyl octane, 1,3,6-triisocyanate hexane, 2,5,7-trimethyl-1,8-diisocyanate-5-isocyanate methyl octane and the like.

The alicyclic polyisocyanate compound includes 1,3,5-triisocyanatecyclohexane, 1,3,5-trimethylisocyanatecyclohexane, 3-isocyanate methyl-3,3,5-trimethylcyclohexylisocyanate, 2-(3-isocyanatepropyl)-2,5-di(isocyanatemethyl)-bicyclo[2,2,1]heptane, 2-(3-isocyanateproplyl)-2,6-di(isocyanatemethyl)-bicyclo[2,2,1]heptane, 3-(3-isocyanatepropyl)-2,5-di(isocyanatemethyl)-bicyclo[2,2,1]heptane, 5-(2-isocyanateethyl)-2-isocyanate methyl-3-(3-isocyanate propyl)-bicyclo[2,2,1]heptane, 6-(2-isocyanateethyl)-2-isocyanatemethyl-3-(3-isocyanate propyl)-bicyclo[2,2,1]heptane, 5-(2-isocyanateethyl)-2-isocyanatemethyl-2-(3-isocyanatepropyl)-bicyclo[2,2,1]heptane, 6-(2-isocyanateethyl)-2-isocyanatemethyl-2-(3-isocyanatepropyl)-bicyclo[2,2,1]heptane and the like.

The araliphatic polyisocyanate compound includes 1,3,5-triisocyanate methyl benzene and the like.

The aromatic polyisocyanate compound includes triphenylmethane-4,4',4"-triisocyanate, 1,3,5-triisocyanate benzene, 2,4,6-triisocyanatetoluene, 4,4'-diphenylmethane-2,2', 5,5'-tetraisocyanate, polymethylene polyphenyl polyisocyanate (polymeric MDI) and the like.

Further, the polyisocyanate compound includes an allophanate-modified product, a biuret modified product, an isocyanurate trimer and the like, and these are obtained by using each of the polyisocyanate compound.

Among these, the aromatic diisocyanate and the aliaromatic polyisocyanate are preferable in the viewpoint of excellent heat resistance of the curable resin composition, and 4,4'-diphenylmethane diisocyanate, 2,4- or 2,6-tolylene diisocyanate, and polymethylene polyphenyl polyisocyanate (polymeric MDI) are especially preferable.

The aliphatic diisocyanate compound, the alicyclic diisocyanate compound, the aliphatic polyisocyanate compound and the alicyclic polyisocyanate compound are preferable due to excellent weather resistance of obtained cured materials. Among these, hexamethylene diisocyanate, isophorone diisocyanate and isocyanurate modified products thereof are preferable. The isocyanurate modified products are particularly preferably a biuret modified product, dimer or trimer of hexamethylene diisocyanate. These modified products can be obtained as tradename Desmodur (registered trademark) N100, N3200, N3300, N3400, N3600, N3800, N3900 manufactured by Covestro (formerly Bayer). These modified products can be obtained as tradename Duranate (registered trademark) 24A-100, TPA-100, TLA-100, TKA-100 manufactured by Asahi Kasei Corporation.

When yellow discoloration occurs during use of these polyisocyanate compounds, the aliphatic polyisocynate or the alicyclic polyisocyanate is preferably used.

The polyisocyanate (C) of the present invention can be a blocked isocyanate obtained by masking an isocyanate group with a masking agent, and inactivating the isocyanate group at ambient temperature. In the blocked isocyanate masked with the blocking agent, the blocking agent is dissociated by heating (for example, 130 to 160° C.) or humidity to regenerate the isocyanate group. Therefore, the blocked isocyanate can be combined with the polyaspartic acid ester (A) and a polyol (D) as set forth below in one component type heat or moisture curable resin composition.

The blocking agent includes an alcohol blocking agent, a phenol blocking agent, an oxime blocking agent, a triazole blocking agent, a caprolactam blocking agent and the like.

Preferred examples of an alcohol blocking agent include methanol, ethanol, propanol, hexanol, laurylalcohol, t-butanol, cyclohexanol and the like. Preferred examples of a phenol blocking agent include xylenol, naphthol, 4-methyl-2,6-di-t-butylphenol. Preferred examples of an oxime blocking agent include 2,6-dimethyl-4-heptanone oxime, methylethylketoxime, 2-heptanone oxime and the like. Preferred examples of other blocking agents include 1,2,4-triazole, 3,5-dimethylpyrrazole and the like. Among these, methanol, xylenol, and methylethylketoxime are preferable.

The amount of the polyisocyanate (C) is determined by amounts of the polyaspartic acid ester (A) and the polyol (D) as set forth below. The amount of the polyisocyanate (C) can be determined by adjusting the equivalent ratio (NCO/active hydrogen containing group) of isocyanate (NCO) group of the polyisocyanate (C) to the active hydrogen containing group (NH) of the polyaspartic acid ester (A) or the active hydrogen containing group (NH and OH) of the polyaspartic acid ester (A) and the polyol (D). The equivalent ratio is preferably from 0.80 to 3.00, more preferably from 0.90 to 2.00, and even preferably from 1.00 to 1.50. When the amount of the polyisocyanate (C) is much small or much large, the curing reaction becomes insufficient.

It is possible that a polyol (D) as set forth below is previously reacted with the polyisocyanate (C) to prepare a prepolymer having an isocyanate group at a terminal of the prepolymer. In the present invention, the prepolymer can be used as the polyisocyanate (C).

A method for synthesizing a urethane prepolymer may be a conventional method. For example, the urethane prepolymer may be obtained by feeding a compound having two or more active hydrogens at a terminal of polyol and the like to a closed reactor equipped with a stirrer, a reflux condenser, a vacuum dehydration device, a nitrogen inlet, formulating a isocyanate compound after dehydrating under reduced pressure, and reacting the compound and the isocyanate compound under nitrogen streaming at 70 to 150° C. for 3 to 8 hours. Alternatively, the urethane prepolymer may be obtained by reacting of the drop of dried polyols with the polyisocyanate compound in the view of controlling reactivity. The equivalent ratio of active hydrogen group (OH) of the polyol to the isocyanate group is preferably 2 or more. A method for preparing the prepolymer includes a method described in Journal of the Society of Rubber Industry, Japan Vol. 68, page 417, (1995).

<Polyol (D)>

The polyol (D) is a preferred component in the curable resin composition of the present invention, and the polyol (D) improves the toughness of the cured product obtained by the curable resin composition in the combination with the polymer fine particles (B). In addition, in the case where the reaction of the polyaspartic acid ester (A) with the polyisocyanate (C) is too fast, the polyol (D) can be used for control of the reaction speed. The polyol (D) is a compound having two or more hydroxyl groups in a molecule. The polyol (D) has an average molecular weight of preferably from 100 to 5000, more preferably 180 to 4000, and particularly preferably 300 to 3000 in the viewpoint of the improvement of toughness and the handling.

The polyol (D) can include an aliphatic alcohol, an aromatic alcohol, polyether polyol, polyester polyol, polyolefin polyol, acryl polyol and the like.

The aliphatic alcohols may be any of dihydric alcohol and a polyhydric alcohol having a hydricity of three or higher (trihydric alcohol, tetrahydric alcohol and the like). The dihydric alcohol includes alkylene glycol (alkylene glycol having about 1 to 6 of carbon atoms) such as ethylene glycol, propylene glycol, 1,3-propanediol, 1,3-butanediol, 1,4-butanediol, 1,5-pentanediol, 1,6-hexanediol, 3-methyl-1,5-pentanediol, neopentylglycol, and dehydrative condensate (diethyleneglycol, dipropyleneglycol, tripropyleneglycol and the like) from two or more molecules of the alkyleneglycol (for example, 2 to 6 molecules and the like). The trihydric alcohol includes glycerol, trimethylolpropane, trimethylolethane, 1,2,6-hexanetriol (especially trihydric alcohol having about 3 to 10 of carbon atoms). The tetrahydric alcohol includes pentaerythritol, diglycerol and the like. The aliphatic alcohols include sugars such as monosaccharide, oligosaccharide, polysaccharide and the like.

The aromatic alcohols include bisphenols such as bisphenol A, and bisphenol F; biphenyls such as dihydroxybiphenyl; polyhydric phenol such as hydroquinone, phenol formaldehyde condensate; naphthalenediol and the like.

The polyether polyol includes a random or block copolymer and the like obtained by ring-opening polymerizing ethylene oxide, propylene oxide, butylene oxide, styrene oxide and the like under the presence of one or two or more active hydrogen-containing initiator (s), and a mixture thereof. The active hydrogen-containing initiator includes diols such as ethylene glycol, diethylene glycol, propylene glycol, dipropylene glycol, 1,3-butane diol, 1,4-butane diol, 1,6-hexane diol, neopentyl glycol, bisphenol A; triols such as trimethylol ethane, trimethylol propane, glycerin; sugars such as monosaccharide, oligosaccharide, polysaccharide; sorbitol; amines such as ammonia, ethylenediamine, urea, monomethyldiethanol amine, monoethyldiethanol amine.

The polyester polyol includes a polymer obtained by condensating diprotic acids and anhydrides thereof such as maleic acid, fumaric acid, adipic acid, sebacic acid, phthalic acid, dodecanedioic acid, isophthalic acid, azelaic acid, with polyhydric alcohols such as ethylene glycol, propylene glycol, 1,4-butandiol, 1,6-hexandiol, diethylene glycol, dipropylene glycol, neopentyl glycol, 3-methyl-1,5-pentanediol under the presence of the esterification catalyst in the range of the temperature of 150 to 270° C. Further, the polyester polyol includes a ring-open polymer such as ε-caprolactone and valerolactone, and an active hydrogen compound having two or more active hydrogens such as polycarbonate diol and castor oil.

The polyolefin polyols include polybutadiene polyol, polyisoprene polyol and hydrogenated products thereof.

Acrylic polyols include a copolymer of a monomer having a hydroxyl group such as hydroxyl ethyl (meth) acrylate, hydroxyl butyl (meth) acrylate, and vinyl phenol with a generic monomer such as n-butyl(meth)acrylate, 2-ethylhexyl(meth)acrylate, as well as a mixture thereof.

Among these, the polyether polyols are preferable due to lower viscosity of the curable resin composition and excellent balance between hardness and toughness of the cured product. In addition, the polyester polyols are preferable in the viewpoint of adhesiveness. From the viewpoint of the impact resistance, the aliphatic alcohol is preferable, more preferable dihydric alcohol and trihydric alcohol, and even preferably propylene glycol.

Among these polyols, a multifunctional polyol of three or more functional groups having three or more hydroxyl groups per one molecule is preferable in the view of high reactivity on the cure and high hard cured materials.

The amount of the multifunctional polyol having three or more functional groups is preferably not less than 10% by weight, more preferably not less than 30% by weight, further preferably not less than 50% by weight, and especially preferably not less than 70% by weight per the total amount (100% by weight) of the polyol (D).

The amount of the polyol (D) is preferably from 0 to 200 parts by weight per 100 parts by weight of the polyaspartic acid ester. In the case where the polyol (D) is used as an essential component, the amount of the polyol (D) is preferably from 1 to 180 parts by weight, more preferably from 10 to 150 parts by weight per 100 parts by weight of the polyaspartic acid ester (A).

<Other Compounded Component>
<Dehydrating Agent>

If necessary, a dehydrating agent may be added to the curable resin composition of the present invention. Water present in the composition can be removed by the addition of a dehydrating agent, thereby improving storage stability and foaming at the time of curing. Specific examples of the dehydrating agent include vinyltrimethoxysilane, calcium oxide, zeolite, molecularsieves, p-toluenesulfonyl isocyanate, and oxazolidines such as 3-ethyl-2-methyl-2-(3-methylbutyl)-1,3-oxazolidine and the like. These can be used alone or in combination of two or more thereof.

When the dehydrating agent is used, the amount used is preferably about 0.1 to 20 parts by weight, more preferably about 0.5 to 10 parts by weight, and particularly preferably about 1 to 5 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Filler>

A filler may be added to the curable resin composition of the present invention. The filler includes, for example, fumed silica, precipitated silica, crystalline silica, molten silica, dolomite, anhydrous silicic acid, hydrous silicic acid, and carbon black; inorganic fillers, such as heavy calcium carbonate, colloidal calcium carbonate, magnesium carbonate, barium carbonate, barium sulfate, diatomaceous earth, baked clay, clay, talc, baryte, anhydrous gypsum, titanium oxide, bentonite, organic bentonite, ferric oxide, aluminum fine powder, flint powder, zinc oxide, active zinc flower, mica, zinc flower, white lead, lithopone, zinc sulfide, zinc aluminium phosphate, Shirasu Balloon, glass microballoon; organic fillers such as organic microballoon of a phenol resin or a vinylidene chloride resin, and resin powder such as PVC powder and PMMA powder; fibrous inorganic fillers such as glass fiber and filament, and the like.

In addition to the above, for example, colored pigments such as titanium oxide, carbon black, iron oxide, lead chromate, chromium oxide, ultramarine, cobalt blue, cyanine blue, cyanine green, lake red, and quinacridone red may also be used.

When the filler is used, the amount used is preferably 1 to 250 parts by weight, more preferably 10 to 200 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Flame Retardant>

If necessary, a flame retardant, such as a phosphorus-based plasticizer (e.g. ammonium polyphosphate and tricresyl phosphate), aluminum hydroxide, magnesium hydroxide, and a thermally expandable graphite, may be added to the curable resin composition of the present invention. The flame retardant may be used alone or in combination of two or more thereof.

As the ammonium polyphosphate, conventionally known ones can be widely used. Among these, from the viewpoint of water resistance, it is preferable to use a surface-treated ammonium polyphosphate such as ammonium polyphosphate which is coated with a resin and microencapsulated, and a surface-modified ammonium polyphosphate, and it is more preferable to use ammonium polyphosphate in which the surface is coated with a melamine-formaldehyde resin.

When the flame retardant is used, its amount is preferably 5 to 200 parts by weight, more preferably 10 to 100 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Dispersant>

If necessary, a dispersant may be added to the curable resin composition of the present invention. The dispersant aids the dispersion of the filler and pigments in the composition. The dispersant may be mixed with the fillers and pigments according to known methods to disperse the fillers and the pigments. A commercially available dispersant may be used. Examples of the commercially available dispersant include, for example, ANTI-TERRA (registered trademark)-U, ANTI-TERRA (registered trademark)-U100, ANTI-TERRA registered trademark)-204, ANTI-TERRA (registered trademark)-205, DISPERBYK (registration trademark)-101, DISPERBYK (registered trademark)-102, DISPERBYK (registered trademark)-103, DISPERBYK (registered trademark)-106, DISPERBYK (registered trademark)-108, DISPERBYK (registered trademark)-109, DISPERBYK (registered trademark)-110, DISPERBYK (registered trademark)-111, DISPERBYK (registered trademark)-112, DISPERBYK (registered trademark)-116, DISPERBYK (registered trademark)-130, DISPERBYK (registered trademark)-140, DISPERBYK (registered trademark)-142, DISPERBYK (registered trademark)-145, DISPERBYK (registered trademark)-161, DISPERBYK (registered trademark)-162, DISPERBYK (registered trademark)-163, DISPERBYK (registered trademark)-164, DISPERBYK (registered trademark)-166, DISPERBYK (registered trademark)-167, DISPERBYK (registered trademark)-168, DISPERBYK (registered trademark)-170, DISPERBYK (registered trademark)-171, DISPERBYK (registered trademark)-174, DISPERBYK (registered trademark)-180, DISPERBYK (registered trademark)-182, DISPERBYK (registered trademark)-183, DISPERBYK (registered trademark)-184, DISPERBYK (registered trademark)-185, DISPERBYK (registered trademark)-2000, DISPERBYK (registered trademark)-2001, DISPERBYK (registered trademark)-2008, DISPERBYK (registered trademark)-2009, DISPERBYK (registered trademark)-2022, DISPERBYK (registered trademark)-2025, DISPERBYK (registered trademark)-2050, DISPERBYK (registered trademark)-2070, DISPERBYK (registered trademark)-2096, DISPERBYK (registered trademark)-2150, DISPERBYK (registered trademark)-2155, DISPERBYK (registered trademark)-2163, DISPERBYK (registered trademark)-2164, BYK (registered trademark)-P104, BYK (registered trademark)-P104S, BYK (registered trademark)-P105, BYK (registration trademark)-9076, BYK (registered trademark)-9077, BYK (registered trademark)-220S, ANTI-TERRA (registered trademark)-250, DISPERBYK (registered trademark)-187, DISPERBYK (registered trademark)-190, DISPERBYK (registered trademark)-191, DISPERBYK (registered trademark)-192, DISPERBYK (registered trademark)-193, DISPERBYK (registered trademark)-194, DISPERBYK (registered trademark)-198, DISPERBYK (registered trademark)-2010, DISPERBYK (registered trademark)-2012, DISPERBYK (registered trademark)-2015, DISPERBYK (registered trademark)-2090, DISPERBYK (registered trademark)-2091, DISPERBYK (registered trademark)-2095 (all in the foregoing manufactured by BYK-Chemie GmbH.), DISPARLON (registered trademark) 2150, DISPARLON (registered trademark) KS-860, DISPARLON (registered trademark) KS-873N, DISPARLON (registered trademark) 7004, DISPARLON (registered trademark) 1831, DISPARLON (registered trademark) 1850, DISPARLON (registered trademark) 1860, DISPARLON (registered trademark) DA-1401, DISPARLON (registered trademark) PW-36, DISPARLON (registered trademark) DA-1200, DISPARLON (registered trademark) DA-550, DISPARLON (registered trademark) DA-703-50, DISPARLON (registered trademark) DA-7301, DISPARLON (registered trademark) DN-900, DISPARLON (registered trademark) DA-325, DISPARLON (registered trademark) DA-375, DISPARLON (registered trademark) DA-234 (all in the foregoing manufactured by Kusumoto Chemicals, Ltd.), EFKAPOLYMER4550 (manufactured by EFKA Company), SOLSPERSE (registered trademark) 27000, SOLSPERSE (registered trademark) 41000, and SOLSPERSE (registered trademark) 53095 (all in the foregoing manufactured by Avecia Ltd.). Among these, ANTI-TERRA (registered trademark)-U100, DISPERBYK (registered trademark)-102, DISPERBYK (registered trademark)-106, DISPERBYK (registered trademark)-108, DISPERBYK (registered trademark)-109, DISPERBYK (registration trademark)-111, DISPERBYK (registered trademark)-116, DISPERBYK (registered trademark)-145, DISPERBYK (registered trademark)-180, DISPERBYK (registered trademark)-185, DISPERBYK (registered trademark)-2008, DISPERBYK (registered trademark)-2096, DISPERBYK (registered trademark)-2155, BYK (registered trademark)-P105, BYK (registered trademark)-9076, BYK (registered trademark)-9077, DISPERBYK (registered trademark)-191, DISPERBYK (registered trademark)-192, DISPERBYK (registered trademark)-2090, DISPERBYK (registration trademark)-2095, DISPARLON (registered trademark) DA-550, DISPARLON (registered trademark) DA-325, DISPARLON (registered trademark) DA-375, and DISPARLON (registered trademark) DA-234 are preferable because they have a high nonvolatile content. The number average molecular weight of the dispersant is preferably 1000 to 100000. If the number average molecular weight of the dispersant is less than 1000, sufficient dispersion stability may not be obtained. If the number average molecular weight exceeds 100000, the viscosity is too high to handle in some cases. The number average molecular weight of the dispersant is more preferably 2000 to 50000, and even more preferably 4000 to 50000.

When the dispersant is used, the amount used is preferably 0.1 to 10 parts by weight, more preferably 0.2 to 3 parts by weight, and even more preferably 0.3 to 1 part by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Defoaming Agent>

If necessary, a defoaming agent may be added to the curable resin composition of the present invention. As the defoaming agent, it is possible to use those which are commercially available. Examples of the commercially available defoaming agent include, for example, defoaming agents, such as BYK (registered trademark)-051, BYK (registered trademark)-052, BYK (registered trademark)-053, BYK (registered trademark)-054, BYK (registered trademark)-055, BYK (registered trademark)-057, BYK (registered trademark)-1752, BYK (registered trademark)-1790, BYK (registered trademark)-060N, BYK (registered trademark)-063, BYK (registered trademark)-065, BYK (registered trademark)-066N, BYK (registered trademark)-067A, BYK (registered trademark)-077, BYK (registered trademark)-088, BYK (registered trademark)-141, BYK (registered trademark)-354, BYK (registered trademark)-392, BYK (registered trademark)-011, BYK (registered trademark)-012, BYK (registered trademark)-017, BYK (registered trademark)-018, BYK (registered trademark)-019, BYK (registered trademark)-020, BYK (registered trademark)-021, BYK (registered trademark)-022, BYK (registered trademark)-023, BYK (registered trademark)-024, BYK (registered trademark)-025, BYK (registered trademark)-028, BYK (registered trademark)-038, BYK (registered trademark)-044, BYK (registered trademark)-093, BYK (registered trademark)-094, BYK (registered trademark)-A-501, BYK (registered trademark)-A-535, BYK (registered trademark)-1610, BYK (registered trademark)-1615, BYK (registered trademark)-1650, BYK (registered trademark)-1730, and BYK (registered trademark)-1790 (all in the foregoing manufactured by BYK-Chemie GmbH.); a defoaming agent such as TEGO (registered trademark) Airex910, TEGO (registered trademark) Airex920, TEGO (registered trademark) Airex940, TEGO (registered trademark) Airex944, TEGO (registered trademark) Airex950, TEGO (registered trademark) Airex980 (all in the foregoing manufactured by Daicel Evonik Ltd.); acrylic defoaming agents, such as DISPARLON (registered trademark) OX-880EF, DISPARLON (registered trademark) OX-881, DISPARLON (registered trademark) OX-883, DISPARLON (registered trademark) OX-883HF, DISPARLON (registered trademark) OX-70, DISPARLON (registered trademark) OX-77EF, DISPARLON (registered trademark) OX-60, DISPARLON (registered trademark) OX-710, DISPARLON (registered trademark) OX-720, DISPARLON (registered trademark) OX-720EF, DISPARLON (registered trademark) OX-750HF, DISPARLON (registered trademark) LAP-10, DISPARLON (registered trademark) LAP-20, and DISPARLON (registered trademark) LAP-30; silicone-based acrylic composite-type defoaming agents, such as DISPARLON (registered trademark) OX-66 and DISPARLON (registered trademark) OX-715; vinyl-based defoaming agents, such as DISPARLON (registered trademark) 1950, DISPARLON (registered trademark) 1951, DISPARLON (registered trademark) 1952, DISPARLON (registered trademark) P-410EF, DISPARLON (registered trademark) P-420, DISPARLON (registered trademark) P-450, DISPARLON (registered trademark) P-425, and DISPARLON (registered trademark) PD-7; and silicone-based defoaming agents, such as DISPARLON (registered trademark) 1930N and DISPARLON (registered trademark) 1934 (all in the foregoing manufactured by Kusumoto Chemicals, Ltd.).

When the defoaming agent is used, the amount used is preferably 0.05 to 10 parts by weight, more preferably 0.2 to 5 parts by weight, and even more preferably 0.3 to 3 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Wetting Agent>

A wetting agent can be added to the curable resin composition if necessary. By the addition of the wetting agent, wettability and adhesion of the curable resin composition or the cured product thereof to other material can be improved. A commercially available wetting agent can be used. The commercially available wetting agent includes TEGO (registered trademark) Twin 4000, TEGO (registered trademark) Wet 240, TEGO (registered trademark) WetKL245, TEGO (registered trademark) Wet 250, TEGO (registered trademark) Wet 260, TEGO (registered trademark) Wet 265, TEGO (registered trademark) Wet 270, TEGO (registered trademark) Wet 280, TEGO (registered trademark) Wet 500, TEGO (registered trademark) Wet 505, TEGO (registered trademark) Wet 510, TEGO (registered trademark) wet 520, manufactured by Daicel Evonik Ltd.

When the wetting agent is used, the amount used is preferably 0.05 to 5 parts by weight, more preferably 0.1 to 3 parts by weight, and even more preferably 0.2 to 1.5 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Solvent>

If necessary, a solvent may be used for the curable resin composition of the present invention in order to reduce the viscosity of the composition, increase the thixotropy, and improve the workability. As the solvent, there is no particular limitation, and various compounds can be used. Specific examples of the solvent include hydrocarbon solvents such as toluene, xylene, heptane, hexane, petroleum-based solvents; halogen-based solvents such as trichloroethylene; ester-based solvents such as ethyl acetate and butyl acetate; ketone-based solvents such as acetone, methyl ethyl ketone, methyl isobutyl ketone; ether-based solvents such as propylene glycol monomethyl ether acetate, and propylene glycol monomethyl ether; and silicone-based solvents such as hexamethylcyclotrisiloxane, octamethylcyclotetrasiloxane, and decamethylcyclopentasiloxane. When the solvent is used, from the problem of outside air pollution, the boiling point of the solvent is preferably 150° C. or more, more preferably 200° C. or more, and especially preferably 250° C. or more. These solvents may be used alone or in combination of two or more thereof.

However, if the amount of the solvent to be added is large, there are cases where influence on the environment and toxicity to human body are high, so that it is preferable to reduce the amount of solvent to be used. Therefore, the amount of the solvent is preferably 50 parts by weight or less, more preferably 30 parts by weight or less, and even more preferably 10 parts by weight or less of 100 parts by weight of the total amount of the polyaspartic acid ester (A), the polymer fine particles (B), and the polyisocyanate (C), or the polyaspartic acid ester (A), the polymer fine particles (B), the polyisocyanate (C), and the polyol (D). It is particularly preferable for the curable resin composition to contain no solvent.

<Tackifier>

A tackifier may be added to the curable resin composition of the present invention as needed. Although the tackifier is not particularly limited, commonly used one can be used irrespective of the state at ordinary temperatures, which may be either a solid or a liquid. Specific examples thereof include styrene based block copolymers and hydrogenated products thereof, phenol resins, modified phenol resins (for example, cashew oil-modified phenol resins, tall oil-modified phenol resins and the like), terpenephenol resins, xylene-phenol resins, cyclopentadiene-phenol resins, coumarone-indene resins, rosin-based resins, rosin ester resins, hydrogenated rosin ester resins, xylene resins, low molecular weight polystyrene-based resins, styrene copolymer resins, petroleum resins (for example, C5 hydrocarbon resins, C9 hydrocarbon resins, C5-C9 hydrocarbon copolymerized resins and the like), hydrogenated petroleum resins, terpene based resins, DCPD resins petroleum resins, and the like. These may be used alone or in combination of two or more thereof. As the styrene-based block copolymers and hydrogenated products thereof, there are exemplified styrene-butadiene-styrene block copolymers (SBS), styrene-isoprene-styrene block copolymers (SIS), styrene-ethylene butylene-styrene block copolymers (SEBS), styrene-ethylenepropylene-styrene block copolymers (SEPS), styrene-isobutylene-styrene block copolymers (SIBS), and the like. These tackifiers may be used alone or in combination of two or more thereof.

When the tackifier is used, the amount used is preferably 5 to 100 parts by weight, and more preferably 10 to 50 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Leveling Agent>

If necessary, a leveling agent may be added to the composition of the present invention. Commercially available products may be used as the leveling agent. Examples of the commercially available products include, for example, BYKETOL (registered trademark)-OK, BYKETOL (registered trademark)-SPECIAL, BYKETOL (registered trademark)-AQ, BYKETOL (registered trademark)-WS (all in the foregoing manufactured by BYK-Chemie GmbH.), DISPARLON (registered trademark) 1970, DISPARLON (registered trademark) 230, DISPARLON (registered trademark) LF-1980, DISPARLON (registered trademark) LF-1982, DISPARLON (registered trademark) LF-1983, DISPARLON (registered trademark) LF-1984, and DISPARLON (registered trademark) LF-1985 (all in the foregoing manufactured by Kusumoto Chemicals, Ltd.).

When the leveling agent is used, the amount used is preferably in a range of 0.05 to 10 parts by weight, more preferably in a range of 0.2 to 5 parts by weight, and even more preferably in a range of 0.3 to 3 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Thixotropic Agent>

A thixotropic agent (anti-sagging agent) may be added to the curable resin composition of the present invention as needed in order to prevent sagging and to improve workability. Although the anti-sagging agent is not particularly limited, examples thereof include, for example, polyamide waxes; hydrogenated castor oil derivatives; metal soaps such as calcium stearate, aluminum stearate, and barium stearate, and the like. The fumed silica shown as the filler can also be used as a thixotropic agent. When a rubber powder having a particle size of 10 to 500 μm as disclosed in Japanese Unexamined Patent Application Publication No. Heill-349916 or an organic fiber as disclosed in Japanese Unexamined Patent Application Publication No. 2003-155389 is used, a composition having a high thixotropy and favorable workability may be obtained. These thixotropic agents (anti-sagging agents) may be used alone or in combination of two or more thereof.

When the thixotropic agent is used, the amount used is in the range of preferably 0.1 to 20 parts by weight per 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Epoxy Resin>

An epoxy resin may be added to the curable resin composition of the present invention as needed.

The examples of the epoxy resin include, for example, known epoxy resins, such as bisphenol A type epoxy resins, bisphenol F type epoxy resins, novolak type epoxy resins, glycidyl ester type epoxy resins, hydrogenated bisphenol A (or F) type epoxy resins, glycidyl ether type epoxy resins, amino-containing glycidyl ether resins, and epoxy compounds obtained by addition reaction of bisphenol A (or F) or polybasic acids to these epoxy resins.

When the epoxy resin is used, the amount used is within a range of 0.1 to 30 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Antioxidant>

An antioxidant (antiaging agent) may be added to the curable resin composition of the present invention as needed. When the antioxidant is used, heat resistance of the cured product can be enhanced. Examples of the antioxidant include, for example, hindered phenolic, monophenolic, bisphenolic, and polyphenolic antioxidants, and among these, hindered phenolic antioxidants are especially preferred. Similarly, hindered amine-based light stabilizers presented as TINUVIN (registered trademark) 622LD, TINUVIN (registered trademark) 144, CHIMASSORB (registered trademark) 944LD, and CHIMASSORB (registered trademark) 119FL (all in the foregoing manufactured by Ciba Specialty Chemicals Inc.); MARK LA-57, MARK LA-62, MARK LA-67, MARK LA-63 and MARK LA-68 (all in the foregoing manufactured by Asahi Denka Kogyo K. K.); and SANOL (registered trademark) LS-770, SANOL (registered trademark) LS-765, SANOL (registered trademark) LS-292, SANOL (registered trademark) LS-2626, SANOL (registered trademark) LS-1114, and SANOL (registered trademark) LS-744 (all in the foregoing manufactured by Sankyo Co., Ltd.) may be used.

When the antioxidant is used, the amount used is within the range of preferably 0.1 to 10 parts by weight, and more preferably 0.2 to 5 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Light Stabilizer>

A light stabilizer may be used to the curable resin composition of the present invention as needed. When the light stabilizer is used, photo-oxidative deterioration of the cured product can be prevented. Examples of the light stabilizer include preferably benzotriazole-based compounds, hindered amine-based compounds, and benzoate-based compounds, among which the hindered amine-based compounds are more preferred. In particular, it is preferred to use a tertiary amine-containing hindered amine-based light stabilizer for the improvement in storage stability of the composition. As the tertiary amine-containing hindered amine-based light stabilizer, there may be exemplified light stabilizers, such as TINUVIN (registered trademark) 622LD, TINUVIN (registered trademark) 144, CHIMASSORB (registered trademark) 119FL (all in the foregoing manufactured by BASF); MARK LA-57, LA-62, LA-67, and LA-63 (all in the foregoing manufactured by ADEKA Corp.); and SANOL (registered trademark) LS-765, LS-292, LS-2626, LS-1114, and LS-744 (all in the foregoing manufactured by Sankyo Co., Ltd.).

When the light stabilizer is used, the amount used is in a range of preferably 0.1 to 10 parts by weight, and more preferably 0.2 to 5 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D).

<Ultraviolet Absorber>

An ultraviolet absorber may be used in the curable resin composition of the present invention as needed. When the ultraviolet absorber is used, the surface weather resistance of the cured product can be improved. Examples of the ultraviolet absorber include benzophenone-based compounds, benzotriazole-based compounds, salicylate-based compounds, substituted tolyl-based compounds, and metal chelate-based compounds and the like. Benzotriazole-based compounds are particularly preferred.

When the ultraviolet absorber is used, the amount used is preferably within a range of 0.1 to 10 parts by weight, and more preferably within a range of 0.2 to 5 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D). Also, it is preferred that the phenolic- or hindered phenolic-based antioxidant, the hindered amine-based light stabilizer, and the benzotriazole-based ultraviolet absorber are used in combination.

<Silane Coupling Agent>

A silane coupling agent may be added to the curable resin composition of the present invention as needed. Such addition of the silane coupling agent can improve the adhesion. Specifically, as the silane coupling agent, there can be used isocyanate group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane, (isocyanatomethyl)dimethoxymethylsilane, (isocyanatomethyl)triethoxysilane, and (isocyanatomethyl)diethoxymethylsilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(6-aminoethyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γaminopropyltrimethoxysilane, N-vinylbenzyl-γ-aminopropyltriethxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N, N'-bis[3-(trimethoxysilyl)propyl]ethylenediamine; ketimine type silanes such as N-(1,3-dimethylbutylidene)-3-(triethoxysilyl)-1-propaneamine; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane, and mercaptomethyltriethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, γ-acryloyloxypropyltriethoxysilane, and methacryloyloxymethyltrimethoxysilane; halogen-containing silanes such as γ-chloropropyltrimethoxysilane; isocyanurate silanes such as tris(3-trimethoxysilylpropyl)isocyanurate, and the like. Additionally, derivatives prepared by modification of these compounds, such as amino-modified silyl polymers, silylated amino polymers, unsaturated aminosilane complexes, phenylamino long-chain alkylsilanes, aminosilylated silicones, silylated polyesters, and the like can also be used as the silane coupling agent. The reaction product of the silane coupling agent includes a reaction product of an aminosilane and an epoxysilane, a reaction product of an aminosilane and an isocyanatosilane, and a partial condensate of various kinds of silane coupling agents.

When the silane coupling agent is used, the amount used is preferably about 0.1 to 15 parts by weight, more preferably 0.5 to 10 parts by weight, and particularly preferably about 1 to 5 parts by weight of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D). If the amount added is below this range, there are cases where the adhesiveness and storage stability of the curable resin composition are not sufficient. On the other hand, if the amount added exceeds this range, the strength of the cured product may decrease in some cases.

<Plasticizer>

A plasticizer may be added to the curable resin composition of the present invention as needed. By adding a plasticizer, the viscosity and the slump property of the curable resin composition, as well as the mechanical properties such as tensile strength, elongation and the like of the cured product obtained by hardening the composition can be adjusted. Examples of the plasticizer include phthalate esters such as dibutyl phthalate, diheptyl phthalate, di(2-ethylhexyl) phthalate, and butylbenzyl phthalate; non-aromatic dibasic acid esters such as dioctyl adipate, dioctyl sebacate, dibutyl sebacate, and isodecyl succinate; glycol esters such as diethylene glycol benzoate and dipentaerythritol hexanoate; aliphatic esters such as butyl oleate, and methyl acetyl ricinoleate; phosphate esters such as tricresyl phosphate and tributyl phosphate; trimellitic acid esters; chlorinated paraffins; hydrocarbon based oils such as alkyldiphenyl and partially hydrogenated terphenyl; process oils; epoxy plasticizers such as epoxidized soybean oil and benzyl epoxystearate.

Since the strength of the cured product from the curable resin composition is decreased as the amount of the plasticizer used is increased, it is preferable to reduce the amount of the plasticizer to be used, and such amount is preferably 100 parts by weight or less, more preferably 50 parts by weight or less, even more preferably 30 parts by weight or less, and especially preferably 10 parts by weight or less of 100 parts by weight of the total amount of the polyaspartic acid ester (A), the polymer fine particles (B), and the polyisocyanate (C) or the polyaspartic acid ester (A), the polymer fine particles (B), the polyisocyanate (C), and the polyol (D). It is most preferable for the curable resin composition to contain no plasticizer.

<Production of Curable Resin Composition>

The curable resin composition of the present invention is a curable resin composition containing the polyaspartic acid ester (A), the polymer fine particles (B), and the polyisocyanate (C). Further, the curable resin composition preferably contains the polyol (D) in the viewpoint of the toughness.

In the curable resin composition, it is preferable to use a dispersion in which the polymer fine particles (B) are dispersed at the state of primary particles in the polyaspartic acid ester (A), or a dispersion in which the polymer fine particles (B) are dispersed at the state of primary particles in the polyol (D) in the viewpoint of the control of the viscosity of the curable resin composition.

The above-mentioned method for preparing the modified polyaspartic acid ester can be used as a method of obtaining a dispersion in which polymer fine particles (B) are dispersed in the state of primary particles in the polyaspartic acid ester (A). As a method of obtaining a dispersion in which polymer fine particles (B) are dispersed in the state of primary particles in the polyol (D), the polyol may be used in place of the polyaspartic acid ester in the method for preparing the above-mentioned modified polyaspartic acid ester. In addition, it is preferred to use the method described in International Publication WO 2009/14037.

In the present invention, the curable resin composition is obtained by adding other polyaspartic acid ester (A) to the dispersion in which the polymer fine particle (B) are dispersed at the state of primary particles in the polyaspartic acid ester (A) as needed to appropriately dilute a composition, adding further the polyisocyanate (C) and the polyol (D), and adding the above-mentioned other compounded component as needed, to disperse the polymer fine particle in the curable resin composition.

In the case where the polyol (D) is formulated in the curable resin composition, the curable resin composition is obtained by adding other polyol (D) to the dispersion in which the polymer fine particle (B) are dispersed at the state of primary particles in the polyol (D) as needed to appropriately dilute a composition, adding further the polyaspartic acid ester (A) and the polyisocyanate (C), and adding the above-mentioned other compounded component as needed, to disperse the polymer fine particles in the curable resin composition.

On the other hand, polymer fine particles (B) may be obtained in the form of powders by coagulating the latex containing the polymer fine particles using methods such as salting-out, and drying the latex. The polymer fine particles (B) in the form of powder can be redispersed in the polyaspartic acid ester (A) using a disperser having high mechanical shear stress such as three paint roll, rollmill, and kneader. In this case, mechanical shear stress is applied to the mixture of the polyaspartic acid ester (A) and the polymer fine particles (B) at a high temperature, and the polymer fine particles (B) can be efficiently dispersed in the polyaspartic acid ester (A). A temperature during dispersing is preferably 50 to 200° C., more preferably 70 to 170° C., even preferably 80 to 150° C., and particularly preferably 90 to 120° C. In the case of less than 50° C., the polymer fine particles (B) are not sufficiently dispersed in some cases. In the case of more than 200° C., the polyaspartic acid ester (A) and the polymer fine particles (B) are thermally deteriorated in some cases.

In addition, the curable resin composition of the present invention may be prepared by mixing two solutions in which the polyaspartic acid ester (A), the polymer fine particles (B), the polyisocyanate (C), and the polyol (D) are divided into a first solution containing a main component and a second solution containing a curing component. For example, the curable resin composition of the present invention may be prepared by mixing a first solution containing the polyaspartic acid ester (A), the polymer fine particles (B), the polyol (D), and a second solution containing the polyisocyanate (C).

<Cured Product>

The present invention encompasses a cured product obtained by curing the curable resin composition. The cured product has excellent toughness by compounding the polymer fine particles.

In addition, the cured product can be obtained by coating the curable resin composition to objects, and curing the composition under conditions of a temperature of 0 to 60° C. and 0.5 to 100 hours. The temperature setting may be used at two or more steps to cure the curable resin composition.

<Application>

The curable resin composition of the present invention is appropriately used for paint, casting, composite material and the like.

The present application claims the benefit of priority to Japanese Patent Application Number 2014-214722 filed on Oct. 21, 2014. The entire contents of the specification of Japanese Patent Application Number 2014-214722 filed on Oct. 21, 2014 are hereby incorporated by reference.

EXAMPLES

Hereinafter, the present invention will be described in detail with reference to Examples and Comparative Examples, but the present invention is not limited thereto, and the variation and the modification of the present invention without departing the gist described above and below are all included the technical scope of the present invention. In the following Examples and Comparative Examples, "part(s)" and "%" mean "part(s) by weight" and "% by weight", respectively.

The measurement and test employed in the following Production Examples, Examples, and Comparative Examples are carried out as follows.

[1] Measurement of Average Particle Diameter of Polymer Fine Particles

A volume average particle diameters (Mv) of the polymer fine particles dispersed in the aqueous latex were measured using MICROTRAC (registered trademark) UPA 150, manufactured by Nikkiso Co., Ltd. A measuring sample was used after diluting with deionized water.

[2] Measurement of MEK Insoluble Content of Polymer Fine Particles 2 g of the powder of the polymer fine particles obtained by drying a latex is immersed in 100 g of methyl ethyl ketone (MEK) at 23° C. for 24 hours, separated in MEK soluble content and MEK insoluble content by centrifugation, and collected MEK insoluble content. Thus, the MEK insoluble content is dried and weighed to calculate a weight ratio (%) of MEK insoluble content to the weight of the polymer fine particles.

[3] Dispersibility of Polymer Fine Particles in Modified Polyaspartic Acid Ester 0.5 g of modified polyaspartic acid ester and 10 g of MEK were mixed at 23° C., and the generation of the precipitation was visually observed. The case where the precipitation was not generated and a uniform dispersion was obtained was considered as "pass", and the case where the precipitation was generated, and/or a uniform dispersion was not obtained was considered as "failure".

[4] Evaluation of Toughness of Cured Product

The toughness of a coating film was evaluated at 23° C. of a test temperature according to ASTM D2794. A curable resin composition was coated at a thickness of 200 μm on a cold rolled steel sheet having a length of 200 mm, a width of 100 mm, and a thickness of 0.8 mm, and obtained laminate was cured at room temperature for 72 hours. A weight of 2 kg was dropped from a different height on the laminate, to determine a height in the case where crack was generated. The height was considered as impact resistant index (cm).

The toughness of a cured product panel was evaluated at 23° C. according to charpy flat wise impact test with unnotched sample of JIS K7111-1. A maximum energy of a hummer equipped with testing apparatus was 2 J, and a size of a test piece had a length of 50 mm, a width of 6 mm, and a thickness of 5 mm.

[5] Appearance of Coating Film

Appearance of the coating film was visually observed in the case where the toughness of the coating film prepared in the above [4] was evaluated, to examine the presence and the absence of the crater, nonuniformity and the like. The case where a coating film had smoothness was considered as "pass", and the case where the coating film had a failure such as crater, nonuniformity, peeling, and stickiness was considered as "failure".

[6] Measurement of Glass Transition Temperature (Tg) of Cured Product

The cured product having a weight of 20 mg was measured under a nitrogen flow using a differential scanning calorimeter DSC 220C manufactured by Seiko Instruments Inc. As the measurement method, the temperature was elevated from 0° C. to 150° C. at a temperature elevation rate of 20° C. per minute, and then immediately lowered to 0° C. at a rate of 40° C. per minute to eliminate a thermal history. Thereafter, the temperature was elevated from 0° C. to 150° C. at a temperature elevation rate of 20° C. per minute to measure the glass transition temperature.

[7] Measurement of Rubber Content of Polymer Fine Particles

An amount of the core layer and an amount of the shell layer were calculated from a monomer amount and a reacted rate of the core layer (rubber layer) and the shell layer, to determine a rubber content by calculating a ratio of the core layer.

[8] Observation of Dispersed State of Polymer Fine Particles

An obtained cured product was freezed by a liquid nitrogen and was broken. A fracture surface was observed using scanning electron microscopy (JEOL JSM-6300F, manufactured by JEOL Ltd.) at a magnification of 10000, to determine a state of dispersibility of polymer fine particles in a cured product.

A polyaspartic acid ester (A), polymer fine particles (B), a polyisocyanate (C), a polyol (D) and other compounded component used in Examples and Comparative Examples are shown. A dispersion in which the polymer fine particles (B) were dispersed in the polyaspartic acid ester (A) was considered as modified polyaspartic acid ester (H).

<Polyaspartic Acid Ester (A)>
A-1: Desmophen (registered trademark) NH1420 (manufactured by Covestro) ($R_1$ and $R_2$ are ethyl group, X is dicyclohexylmethane group, and n is 2)
A-2: Desmophen (registered trademark) NH1520 (manufactured by Covestro) ($R_1$ and $R_2$ are ethyl group, X is dimethyldicyclohexylmethane group, and n is 2)
<Polymer Fine Particles (B)>
The detail of the polymer fine particles is referred to production examples as set forth below.
<Polyisocyanate (C)>
C-1: Desmodur (registered trademark) N3300 (manufactured by Covestro) (modified hexamethylene diisocyanate)
C-2: Desmodur (registered trademark) N3900 (manufactured by Covestro) (modified hexamethylene diisocyanate)
C-3: DURANATE (registered trademark) TPA100 (manufactured by Asahi Kasei Corporation) (modified hexamethylene diisocyanate)
<Polyol (D)>
D-1: polypropylene glycol having an average molecular weight of 1000 (diol type, ACTCOL D-1000 manufactured by Mitsui Chemicals, Inc.)
D-2: polypropylene glycol having an average molecular weight of 3000 (diol type, ACTCOL D-3000 manufactured by Mitsui Chemicals, Inc.)
D-3: polypropylene glycol having an average molecular weight of 300 (triol type, ACTCOL T-300 manufactured by Mitsui Chemicals, Inc.)
<Other Compounded Components>
Dehydrated agent (E): Zeolite A3 having a spherical shape and a mesh of 4 to 8 (manufactured by Wako Pure Chemical Industries, Ltd.)
Defoaming Agent (F): TEGO (registered trademark) Airex 944 manufactured by Daicel Evonik Ltd.
Wetting agent (G): TEGO (registered trademark) Wet 250 manufactured by Daicel Evonik Ltd.
<Polymer Fine Particles (B)>
B-1 to B-5: B-1 to B-3 each represent a core shell polymer having a butadiene rubber core as a main component of the core, B-4 represents a core shell polymer having organosiloxane rubber as a main component of the core, B-5 represents a core shell polymer having acrylic rubber as a main component of the core.

Production examples of polymer fine particles (B-1 to B-5) and production examples of modified polyaspartic acid esters (H-1 to H-5) in which polymer fine particles (B-1 to B-5) are dispersed in polyaspartic acid ester (A) are shown below.

(Production Example of Polymer Fine Particles)
1. Formation of Core Layer

Production Example 1-1

Preparation of Polybutadiene Rubber Latex (R-1)

A pressure resistant polymerization reactor was charged with 200 parts of deionized water, 0.03 parts of tripotassium phosphate, 0.25 parts of potassium dihydrogen phosphate, 0.002 parts of disodium ethylenediaminetetraacetate (EDTA), 0.001 parts of ferrous sulfate heptahydrate (Fe), and 0.15 parts of sodium dodecylbenzenesulfonate (SDS), and the mixture was stirred while sufficiently purging with nitrogen to remove oxygen. Thereafter, 100 parts of butadiene (BD) was introduced into the system, and the temperature was raised to 45° C. To the polymerization reactor were added 0.015 parts of p-menthane hydroperoxide (PHP) and then 0.04 parts of sodium formaldehyde sulfoxylate (SFS), thereby initiating polymerization. At four hours after the polymerization initiation, 0.3 parts of SDS, 0.01 parts of PHP, 0.0015 parts of EDTA, and 0.001 parts of Fe were introduced thereto. After seven hours of polymerization, 0.4 parts of SDS was added. After ten hours of polymerization, residual monomers were removed by devolatilization under reduced pressure to terminate the polymerization. Thus, a latex (R-1) that contains polybutadiene rubber particles was obtained. The polymerized rate was 99% or more. The polybutadiene rubber particles contained in the obtained latex had a volume average particle diameter of 0.18 μm.

Production Example 1-2

Preparation of Polyorganosiloxane Rubber Latex (R-2)

A mixture of 251 parts of deionized water, 1.8 parts of dodecylbenzene sulfonate, 100 parts of octamethyl cyclotetrasiloxane, 2 parts of tetraethoxy siloxane, and 2 parts of γ-acryloyloxypropyl dimethoxymethylsilane was stirred with a homomixer at 10000 rpm for 5 minutes to prepare emulsion. The emulsion was passed through a high pressure homogenizer set at a pressure of 30 MPa two times. The emulsion was charged in a lump into a glass reactor having five necks equipped with a stirrer, a reflux condenser, a nitrogen inlet, an apparatus for adding auxiliary raw materials including monomers and an emulsifying agent and a thermometer. While the system was stirred, the temperature was increased at 80° C. over about 40 minutes, and the reaction was carried out at 80° C. for 6 hours. After the system was cooled to 25° C. and then left for 20 hours, and the pH value of the mixture was adjusted to 6.8 with sodium hydroxide, and the polymerization was terminated, thereby producing a latex which contained polyorganosiloxane rubber particles (R-2). The polymerized rate was 87%. The polyorganosiloxane (polydimethylsiloxane) rubber particles contained in the latex had a volume average particle diameter of 0.3 μm.

Production Example 1-3

Preparation of Acrylic Rubber Latex (R-3)

Into a glass reactor having five necks equipped with a reflux condenser, a nitrogen inlet, an apparatus for adding monomers and an emulsifying agent, and a thermometer were charged 225 parts of deionized water, 0.002 parts of EDTA, 0.001 parts of Fe, 0.05 parts of SFS and 0.7 parts of SDS. Subsequently, the system was heated to 60° C. while stirring in a nitrogen gas stream.

Subsequently, a mixture of 3 parts of 2-ethylhexyl acrylate (2-EHA), 6.6 parts of n-butyl acrylate (BA), 0.4 parts of allyl methacrylate (ALMA) and 0.002 parts of cumene hydroperoxide (CHP) was added to the system to stir for 1 hour.

Further, a mixture containing 27 parts of 2-EHA, 59.4 parts of BA, 3.6 parts of ALMA, and 0.02 parts of CHP was added dropwise continuously over 4 hours. After two and four hours of polymerization, 0.2 parts of SDS was added respectively. The stirring of the system was continued for 1 hour after the completion of the addition of the monomer mixture to complete the polymerization, thereby producing a latex (R-3) which contained acrylic rubber particles. The polymerized rate was 99% or more. The acrylic rubber particles contained in the latex had a volume average particle diameter of 0.1 μm.

2. Preparation of Polymer Fine Particles (B) (Formation of Shell Layer)

Production Example 2-1

Preparation of Latex (B-1LX) Containing Polymer Fine Particles (B-1)

Into a glass reactor having five necks equipped with a reflux condenser, a nitrogen inlet, an apparatus for adding monomers and an emulsifying agent, and a thermometer were charged with 1575 parts (corresponding to 518 parts of polybutadiene rubber particles) of the latex (R-1) obtained in Production Example 1-1 and 315 parts of deionized water, and the mixture was stirred at 60° C. while purging with nitrogen. After 0.024 parts of EDTA, 0.006 parts of Fe, and 1.2 parts of SFS were added, a mixture of graft monomers (130 parts of styrene (ST), 21 parts of methyl methacrylate (MMA)), 21 parts of hydroxybutyl acrylate (HBA)), and 0.4 parts of cumene hydroperoxide (CHP) was continuously added thereto over a period of 2 hours to carry out graft polymerization. After completion of the addition, the mixture was stirred for further 2 hours to finish the reaction, thereby obtaining a latex (B-1LX) of a core shell polymer (B-1). The polymerized rate was 99% or more. The rubber content of the core shell polymer (B-1) was 75% from the charge amount and the reacted rate. A volume average particle diameter of the polymer fine particles (B-1) contained in the obtained latex was 0.20 μm and MEK insoluble content was 98%.

Production Example 2-2

Preparation of Latex (B-2LX) of Polymer Fine Particles (B-2)

The latex (B-2LX) of the polymer fine particles (B-2) was prepared in the same manner as Production Example 2-1 except that ST 69 parts, MMA 11 parts, HBA 11 parts, CHP 0.2 parts were used in place of ST 130 parts, MMA 12 parts, HBA 21 parts, CHP 0.4 parts. The polymerized rate was 99% or more. The rubber content of the core shell polymer (B-2) was 85% from the charge amount and the reacted rate. A volume average particle diameter of the polymer fine particles (B-2) contained in the obtained latex was 0.19 μm and MEK insoluble content was 98%.

Production Example 2-3

Preparation of Latex (B-3LX) of Polymer Fine Particles (B-3)

The latex (B-3LX) of the polymer fine particles (B-3) was prepared in the same manner as Production Example 2-2 except that ST 212 parts, MMA 34 parts, HBA 34 parts were used in place of ST 69 parts, MMA 11 parts, HBA 11 parts, 2,2'-azobisisobutylonitrile (AIBN) 0.6 parts were used in place of CHP 0.2 parts, and AIBN was added to the system before the addition of the graft monomer. The polymerized rate was 99% or more. The rubber content of the polymer fine particles (B-3) was 65% from the charge amount and the reacted rate. A volume average particle diameter of the polymer fine particles (B-3) contained in the obtained latex was 0.21 μm and MEK insoluble content was 88%.

Production Example 2-4

Preparation of Latex (B-4LX) of Polymer Fine Particles (B-4)

Into a glass reactor having five necks equipped with a reflux condenser, a nitrogen inlet, an apparatus for adding monomers and an emulsifying agent, and a thermometer were charged with 2060 parts (corresponding to 510 parts of polyorganosiloxane rubber particles) of the latex (R-2) obtained in Production Example 1-2, and the mixture was stirred at 60° C. while purging with nitrogen. After 0.024 parts of EDTA, 0.006 parts of Fe, and 1.2 parts of SFS were added, a mixture of graft monomers (69 parts of ST, 11 parts of MMA, and 11 parts of HBA) and 0.2 parts of CHP was continuously added thereto over a period of 2 hours to carry out graft polymerization. After completion of the addition, the mixture was stirred for further 2 hours to finish the reaction, thereby obtaining a latex (B-4LX) of a polymer fine particles (B-4). The polymerized rate was 99% or more. The rubber content of the polymer fine particles (B-4) was 85% from the charge amount and the reacted rate. A volume average particle diameter of the polymer fine particles (B-4) contained in the obtained latex was 0.32 μm and MEK insoluble content was 96%.

Production Example 2-5

Preparation of Latex (B-5LX) of Polymer Fine Particles (B-5)

Into a glass reactor having five necks equipped with a reflux condenser, a nitrogen inlet, an apparatus for adding monomers and an emulsifying agent, and a thermometer were charged with 1680 parts (corresponding to 510 parts of acrylic rubber particles) of the latex (R-3) obtained in Production Example 1-3 and 0.1 parts of SDS, and the mixture was stirred at 60° C. while purging with nitrogen. After 0.024 parts of EDTA, 0.006 parts of Fe, and 1.2 parts of SFS were added, a mixture of graft monomers (69 parts of ST, 11 parts of MMA, 10 parts of HBA, and 1 part of ALMA) and 0.3 parts of t-butylhydroperoxide (t-BHP) was continuously added thereto over a period of 2 hours to carry out graft polymerization. After completion of the addition, the mixture was stirred for further 2 hours to finish the reaction, thereby obtaining a latex (B-5LX) of polymer fine particles (B-5). The polymerized rate was 99% or more. The rubber content of the polymer fine particles (B-5) was 85% from the charge amount and the reacted rate. A volume average particle diameter of the polymer fine particles (B-5) contained in the obtained latex was 0.1 μm and MEK insoluble content was 99%.

3. Preparation of Modified Polyaspartic Acid Ester (H-1 to H-5) of Polymer Fine Particles (B) Dispersed in Polyaspartic Acid Ester (A)

Production Example 3-1

Preparation of Modified Polyaspartic Acid Ester (H-1) Based on Polyaspartic Acid Ester (A-1)

100 parts of methyl ethyl ketone (MEK) was introduced into a 1 L mixing tank at 25° C., and the aqueous latex (B-1LX) (corresponding to 30 parts of polymer fine particles) of the polymer fine particles obtained in Production Example 2-1 was charged with stirring. After uniformly mixing, 150 parts of water was charged at a feed rate of 60 parts/minute. After completion of the supply, stirring was stopped immediately to obtain floatable aggregates and a slurry liquid containing aqueous phase containing a portion of organic solvent. Then, the aqueous phase was discharged from the discharging port of the tank bottom. 70 parts of MEK was added to the resulting agglomerates, and uniformly mixed to obtain a dispersion in which polymer fine particles were uniformly dispersed. This dispersion was mixed with 90 parts of a polyaspartic acid ester (A-1). MEK was removed from this mixture with a rotary evaporator. Thus, a modified polyaspartic acid ester (H-1) in which polymer fine particles (B-1) were dispersed in an amount of 25% by weight in the polyaspartic acid ester (A-1) was obtained.

Production Example 3-2

Preparation of Modified Polyaspartic Acid Ester (H-2) Based on Polyaspartic Acid Ester (A-1)

A modified polyaspartic acid ester (H-2) in which polymer fine particles (B-2) were dispersed in an amount of 25% by weight in the polyaspartic acid ester (A-1) was obtained in the same manner as Production Example 3-1 except that the aqueous latex (B-2LX) of the polymer fine particles was used in place of the aqueous latex (B-1LX) of the polymer fine particles used in the production example 3-1.

Production Example 3-3

Preparation of Modified Polyaspartic Acid Ester (H-3) Based on Polyaspartic Acid Ester (A-1)

A modified polyaspartic acid ester (H-3) in which polymer fine particles (B-3) were dispersed in an amount of 25% by weight in the polyaspartic acid ester (A-1) was obtained in the same manner as Production Example 3-1 except that the aqueous latex (B-3LX) of the polymer fine particles was used in place of the aqueous latex (B-1LX) of the polymer fine particles used in the production example 3-1.

Production Example 3-4

Preparation of Modified Polyaspartic Acid Ester (H-4) Based on Polyaspartic Acid Ester (A-1)

A modified polyaspartic acid ester (H-4) in which polymer fine particles (B-4) were dispersed in an amount of 25% by weight in the polyaspartic acid ester (A-1) was obtained in the same manner as Production Example 3-1 except that the aqueous latex (B-4LX) of the polymer fine particles was used in place of the aqueous latex (B-1LX) of the polymer fine particles used in the Production Example 3-1.

Production Example 3-5

Preparation of Modified Polyaspartic Acid Ester (H-5) Based on Polyaspartic Acid Ester (A-1)

A modified polyaspartic acid ester (H-5) in which polymer fine particles (B-5) were dispersed in an amount of 25% by weight in the polyaspartic acid ester (A-1) was obtained in the same manner as Production Example 3-1 except that the aqueous latex (B-5LX) of the polymer fine particles was used in place of the aqueous latex (B-1LX) of the polymer fine particles used in the Production Example 3-1.

The properties of polymer fine particles and modified polyaspartic acid ester used in Examples and Comparative Examples are shown in Tables 1 and 2.

TABLE 1

|  | Production Example 2-1 B-1 | Production Example 2-2 B-2 | Production Example 2-3 B-3 | Production Example 2-4 B-4 | Production Example 2-5 B-5 |
|---|---|---|---|---|---|
| Volume average particle diameter ($\mu$m) | 0.2 | 0.19 | 0.21 | 0.32 | 0.1 |
| Rubber type | Butadiene rubber | Butadiene rubber | Butadiene rubber | Organosiloxane rubber | Acrylic rubber |
| Rubber content (% by weight) | 75 | 85 | 65 | 85 | 85 |
| MEK insoluble content (% by weight) | 98 | 98 | 88 | 96 | 99 |

TABLE 2

|  | Production Example 3-1 H-1 | Production Example 3-2 H-2 | Production Example 3-3 H-3 | Production Example 3-4 H-4 | Production Example 3-5 H-5 |
|---|---|---|---|---|---|
| Polyaspartic acid ester | A-1(75%) | A-1(75%) | A-1(75%) | A-1(75%) | A-1(75%) |
| Polymer fine particles | B-1(25%) | B-2(25%) | B-3(25%) | B-4(25%) | B-5(25%) |
| MEK - dispersibility test | Pass | Pass | Pass | Pass | Pass |

Examples 1 to 13, Comparative Examples 1 to 7

Each of the components except polyisocyanate (C) was weighed according to a formulation shown in Table 3, and these components were homogeneously mixed by using stirring equipment (planetary centrifugal mixer, Awatori Rentaro, manufactured by Thinky). Polyisocyanate (C) was added thereto in an amount shown in Table 3, the mixture was uniformly mixed by the same stirring equipment, and the mixture was defoamd under reduced pressure to obtain a curable resin composition. The obtained composition was coated at a thickness of 200 $\mu$m on a cold rolled steel sheet having a length of 200 mm, a width of 100 mm, and a thickness of 0.8 mm, and cured at 23° C. for 72 hours, to prepare a cured coating film as a cured product. The impact resistance and appearance were evaluated by using the cured product obtained. Results are shown in Table 3.

TABLE 3

| | Component | | tradename or feature | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|---|
| Compounded amount/parts | Polyaspartic acid ester (A) | A-1 | Desmophen NH1420 | 49.2 | 42.3 | 34.9 | 42.3 | 42.3 | 42.3 | 42.3 | 37.8 | 38.7 | 33.7 | 23.3 |
| | | A-2 | Desmophen NH1520 | | | | | | | | | | | |
| | Polymer fine particles (B) | H-1 | B-1/A-1 = 25/75 (weight ratio) | 8.3 | 16 | 24.3 | | | | | | | | |
| | polyaspartic acid ester (H) | H-2 | B-2/A-1 = 25/75 (weight ratio) | | | | 16 | | | | 16 | 16 | 16 | 16 |
| | | H-3 | B-3/A-1 = 25/75 (weight ratio) | | | | | 16 | | | | | | |
| | | H-4 | B-4/A-1 = 25/75 (weight ratio) | | | | | | 16 | | | | | |
| | | H-5 | B-5/A-1 = 25/75 (weight ratio) | | | | | | | 16 | | | | |
| | Polyisocyanate (C) | C-1 | Desmodur N3300 | 42.5 | 41.7 | 40.8 | 41.7 | 41.7 | 41.7 | 41.7 | 40.6 | 39.6 | 45.2 | 37.2 |
| | | C-2 | Desmodur N3900 | | | | | | | | | | | |
| | Polyol (D) | D-1 | ACTCOL D-1000 | | | | | | | | 5.6 | | | |
| | | D-2 | ACTCOL D-3000 | | | | | | | | | 5.7 | | |
| | | D-3 | ACTCOL T-300 | | | | | | | | | | 5.1 | 23.5 |
| Parts of formulation (part by weight) | | | | 100 | 100 | 100 | 100 | 100 | 100 | 100 | 100 | 100 | 100 | 100 |
| Other compounded component | E | | Dehydrated agent Zeolite A-3 | 1 | 1 | 1 | 1 | 1 | 1 | 1 | 1 | 1 | 1 | 1 |
| | F | | Defoaming Agent TEGO Airex944 | 0.5 | 0.5 | 0.5 | 0.5 | 0.5 | 0.5 | 0.5 | 0.5 | 0.5 | 0.5 | 0.5 |
| | G | | Wetting agent TEGO Wet250 | 0.5 | 0.5 | 0.5 | 0.5 | 0.5 | 0.5 | 0.5 | 0.5 | 0.5 | 0.5 | 0.5 |
| Total parts of formulation (part by weight) | | | | 102 | 102 | 102 | 102 | 102 | 102 | 102 | 102 | 102 | 102 | 102 |
| Rate (%) of (A) to (D) | Polyaspartic acid ester (A) | | | 55.4 | 54.3 | 53.1 | 54.3 | 54.3 | 54.3 | 54.3 | 49.8 | 50.7 | 45.7 | 35.3 |
| | Polymer fine particles (B) | | | 2.1 | 4 | 6.1 | 4 | 4 | 4 | 4 | 4 | 4 | 4 | 4 |
| | Polyisocyanate (C) | | | 42.5 | 41.7 | 40.8 | 41.7 | 41.7 | 41.7 | 41.7 | 40.6 | 39.6 | 45.2 | 37.2 |
| | Polyol (D) | | | 0 | 0 | 0 | 0 | 0 | 0 | 0 | 5.6 | 5.7 | 5.1 | 23.5 |
| Total of (A) to (D) (% by weight) | | | | 100 | 100 | 100 | 100 | 100 | 100 | 100 | 100 | 100 | 100 | 100 |

TABLE 3-continued

| | | | | Example 12 | Example 13 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Equivalent ratio of NCO from polyisocyanate (C) to active hydrogen from polyaspartic acid ester (A) and polyol (D) | | | | 1.1 | 1.1 | 1.1 | 1.1 | 1.1 | 1.1 | 1.1 | 1.1 | 1.1 |
| Rate (%) of polymer fine particles (B) of the total components | | | | 2 | 6 | 4 | 4 | 4 | 4 | 4 | 4 | 4 |
| Impact resistant index (cm) | | | | 92 | 101 | 110 | 106 | 88 | 99 | 118 | 130 | 112 | 
| Appearance of coating film | | | | Pass | Pass | Pass | Pass | Pass | Pass | Pass | Pass | Pass |
| | Component | | tradename or feature | | | | | | | | | |
| Compounded amount/parts | Polyaspartic acid ester (A) | A-1 | Desmophen NH1420 | 44.6 | 15.4 | 56.6 | 51.9 | 52.8 | 47.6 | 36.8 | 59.4 | 28.5 |
| | | A-2 | Desmophen NH1520 | | 27.4 | | | | | | | 28.5 |
| | Polymer fine particles (B) as modified polyaspartic acid ester (H) | H-1 | B-1/A-1 = 25/75 (weight ratio) | | | | | | | | | |
| | | H-2 | B-2/A-1 = 25/75 (weight ratio) | | | | | | | | | |
| | | H-3 | B-3/A-1 = 25/75 (weight ratio) | | | | | | | | | |
| | | H-4 | B-4/A-1 = 25/75 (weight ratio) | 16.5 | 16 | | | | | | | |
| | | H-5 | B-5/A-1 = 25/75 (weight ratio) | | | | | | | | | |
| | Polyisocyanate (C) | C-1 | Desmodur N3300 | | 41.2 | 43.4 | 42.3 | 41.3 | 47.1 | 38.7 | | 43 |
| | | C-2 | Desmodur N3900 | 38.9 | | | | | | | 40.6 | |
| | Polyol (D) | D-1 | ACTCOL D-1000 | | | | 5.8 | | | 24.5 | | |
| | | D-2 | ACTCOL D-3000 | | | | | 5.9 | | | | |
| | | D-3 | ACTCOL T-300 | | | | | | 5.3 | | | |
| Parts of formulation (part by weight) | | | | 100 | 100 | 100 | 100 | 100 | 100 | 100 | 100 | 100 |
| Other compounded component | E | Dehydrated agent Zeolite A-3 | | 1 | 1 | 1 | 1 | 1 | 1 | 1 | 1 | 1 |
| | F | Defoaming Agent Airex944 | | 0.5 | 0.5 | 0.5 | 0.5 | 0.5 | 0.5 | 0.5 | 0.5 | 0.5 |
| | G | Wetting agent TEGO Wet250 | | 0.5 | 0.5 | 0.5 | 0.5 | 0.5 | 0.5 | 0.5 | 0.5 | 0.5 |
| Total parts of formulation (part by weight) | | | | 102 | 102 | 102 | 102 | 102 | 102 | 102 | 102 | 102 |

Note: Comparative Example 7 Impact resistant index = >160.

TABLE 3-continued

| | | | | | | | | | |
|---|---|---|---|---|---|---|---|---|---|
| Rate (%) of (A) to (D) | Polyaspartic acid ester (A) | 57 | 54.8 | 56.6 | 51.9 | 52.8 | 47.6 | 36.8 | 59.4 | 57 |
| | Polymer fine particles (B) | 4.1 | 4 | 0 | 0 | 0 | 0 | 0 | 0 | 0 |
| | Polyisocyanate (C) | 38.9 | 41.2 | 43.4 | 42.3 | 41.3 | 47.1 | 38.7 | 40.6 | 43 |
| | Polyol (D) | 0 | 0 | 0 | 5.8 | 5.9 | 5.3 | 24.5 | 0 | 0 |
| Total of (A) to (D) (% by weight) | | 100 | 100 | 100 | 100 | 100 | 100 | 100 | 100 | 100 |
| Equivalent ratio of NCO from polyisocyanate (C) to active hydrogen from polyaspartic acid ester (A) and polyol (D) | | 1.05 | 1.1 | 1.1 | 1.1 | 1.1 | 1.1 | 1.1 | 1.05 | 1.1 |
| Rate (%) of polymer fine particles (B) of the total components | | 4 | 4 | 0 | 0 | 0 | 0 | 0 | 0 | 0 |
| Impact resistant index (cm) | | 150 | 152 | 70 | 75 | 77 | 70 | >160 | 88 | 85 |
| Appearance of coating film | | Pass | Pass | Pass | Pass | Pass | Pass | Failure | Pass | Pass |

From the results of Table 3, a cured product or coating film obtained from the curable resin composition of the present invention had high impact resistance and good appearance. It was confirmed that polymer fine particles were dispersed at state of primary particles in a cured product.

Examples 14 to 16, Comparative Example 8

Each of the components except polyisocyanate (C) was weighed according to a formulation shown in Table 4, and these components were homogeneously mixed by using stirring equipment (planetary centrifugal mixer, Awatori Rentaro, manufactured by Thinky). Polyisocyanate (C) was added thereto in an amount shown in Table 4, the mixture was uniformly mixed by the same stirring equipment, and the mixture was defoamd under reduced pressure to obtain a curable resin composition. The curable resin composition was poured into a mold having a size of 150 mm×100 mm×5 mm and teflon (registered trademark) coating thereto, and the composition was cured at 30° C. for two hours, and at 50° C. for two hours to prepare a cured product. The cured product was cut, the charpy impact test and a glass transition temperature were evaluated by using the cured product. Results are shown in Table 4. It was confirmed that polymer fine particles were dispersed at state of primary particles in the cured product.

TABLE 4

|  | Component |  | tradename or feature | Example 14 | Example 15 | Example 16 | Comparative Example 8 |
|---|---|---|---|---|---|---|---|
| Compounded amount/parts | Polyaspartic acid ester (A) | A-1 | Desmophen NH1420 | 36.5 | 36.5 | 4.3 | 58 |
|  | Polymer fine particles (B) | H-3 | B-3/A-1 = 25/75(weight ratio) | 24 |  | 60 |  |
|  | as modified polyaspartic acid ester (H) | H-4 | B-4/A-1 = 25/75(weight ratio) |  | 24 |  |  |
|  | Polyisocyanate (C) | C-3 | DURANATE TPA100 | 39.5 | 39.5 | 35.7 | 42 |
|  | Parts of formulation (part by weight) |  |  | 100 | 100 | 100 | 100 |
|  | Other compounded component | E | Dehydrated agent Zeolite A-3 | 1 | 1 | 1 | 1 |
|  |  | F | Defoaming Agent TEGO Airex944 | 0.5 | 0.5 | 0.5 | 0.5 |
|  | Total parts of formulation (part by weight) |  |  | 101.5 | 101.5 | 101.5 | 101.5 |
| Rate (%) of | Polyaspartic acid ester (A) |  |  | 54.5 | 54.5 | 49.3 | 58 |
| (A) to (C) | Polymer fine particles (B) |  |  | 6 | 6 | 15 | 0 |
|  | Polyisocyanate (C) |  |  | 39.5 | 39.5 | 35.7 | 42 |
|  | Total of (A) to (C) (% by weight) |  |  | 100 | 100 | 100 | 100 |
| Equivalent ratio of NCO from polyisocyanate (C) to active hydrogen from polyaspartic acid ester (A) |  |  |  | 1.1 | 1.1 | 1.1 | 1.1 |
| Rate (%) of polymer fine particles (B) of the total components |  |  |  | 6 | 6 | 15 | 0 |
| Charpy imapct resistance (kJ/m$^2$) |  |  |  | 52 | 61 | No fracture | 30 |
| Glass transition temperature (° C.) |  |  |  | 85 | 85 | 85 | 85 |

From the results of Table 4, a cured product obtained from the curable resin composition of the present invention maintained a glass transition temperature and had high impact resistance.

The invention claimed is:

1. A modified polyaspartic acid ester comprising a polyaspartic acid ester (A) and polymer fine particles (B), wherein the polymer fine particles have a volume average particle diameter of from 0.01 to 0.6 µm and an amount of the polymer fine particles is from 0.5 to 70% by weight,
wherein the polymer fine particles (B) have a core-shell structure,
wherein the polymer fine particles (B) comprise a core layer comprising an elastic rubber of a crosslinked polymer and a shell layer comprising a polymer graft-polymerized on the core layer,
wherein the shell layer of the polymer fine particles (B) is formed by polymerization of at least a monomer having at least one hydroxyl group, and
wherein a rubber content of the polymer fine particles (B) is from 70 to 95% by weight.

2. The modified polyaspartic acid ester according to claim 1, wherein the core layer comprises at least one rubber selected from the group consisting of diene rubber, (meth) acrylate rubber, and organosiloxane rubber.

3. The modified polyaspartic acid ester according to claim 1, wherein the shell layer of the polymer fine particles (B) is formed by polymerization with at least one additional monomer selected from the group consisting of an aromatic vinyl monomer, a cyanide vinyl monomer, and a (meth) acrylate monomer.

4. The modified polyaspartic acid ester according to claim 1, wherein a methyl ethyl ketone insoluble content of the polymer fine particles (B) is 85% by weight or more.

5. The modified polyaspartic acid ester according to claim 1, wherein the polymer fine particles (B) are uniformly dispersed at the state of primary particles in the polyaspartic acid ester (A).

6. A curable resin composition comprising a polyaspartic acid ester (A), polymer fine particles (B) having a volume average particle diameter of from 0.01 to 0.6 µm, and a polyisocyanate (C),
wherein the polymer fine particles (B) have a core-shell structure,
wherein the polymer fine particles (B) comprise a core layer comprising an elastic rubber of a crosslinked polymer and a shell layer comprising a polymer graft-polymerized on the core layer,
wherein the shell layer of the polymer fine particles (B) is formed by polymerization of at least a monomer having at least one hydroxyl group, and
wherein a rubber content of the polymer fine particles (B) is from 70 to 95% by weight.

7. The curable resin composition according to claim 6, further comprising a polyol (D).

8. The curable resin composition according to claim 6, wherein the core layer comprises at least one rubber selected from the group consisting of diene rubber, (meth)acrylate rubber, and organosiloxane rubber.

9. The curable resin composition according to claim 6, wherein the shell layer of the polymer fine particles (B) is formed by polymerization with at least one additional monomer selected from the group consisting of an aromatic vinyl monomer, a cyanide vinyl monomer, and a (meth)acrylate monomer.

10. The curable resin composition according to claim 6, wherein a methyl ethyl ketone insoluble content of the polymer fine particles (B) is 85% by weight or more.

11. The curable resin composition according to claim 6, wherein the polymer fine particles (B) are uniformly dispersed at the state of primary particles in the curable resin composition.

12. The curable resin composition according to claim 6, wherein an amount of the polymer fine particles (B) is from 0.1 to 20% by weight per 100% by weight of the sum of the polyaspartic acid ester (A), the polymer fine particles (B), the polyisocyanate (C), and the polyol (D).

13. The curable resin composition according to claim 7, wherein an equivalent ratio of an isocyanate group (NCO group) of the polyisocyanate (C) to a total active hydrogen-containing group of the polyaspartic acid ester (A) and the polyol (D) is from 0.80 to 3.00.

14. The curable resin composition according to claim 6, wherein an amount of the polyol (D) is from 0 to 200 parts by weight per 100 parts by weight of the polyaspartic acid ester (A).

15. A cured product obtained by curing the curable resin composition of claim 6.

16. The modified polyaspartic acid ester according to claim 1, wherein the polyaspartic acid ester (A) is represented by the following formula (1), wherein $R_1$ and $R_2$ are the same or different, and $R_1$ and $R_2$ represent an organic group having from 1 to 18 of carbon atoms, X is a divalent aliphatic hydrocarbon group having from 6 to 30 of carbon atoms in a cyclic or linear, and n is an integer of at least 2,

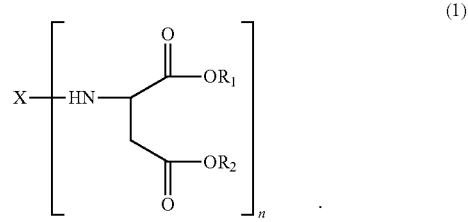

(1)

17. The modified polyaspartic acid ester according to claim 1, wherein the monomer having at least one hydroxyl group is at least one of hydroxyethyl (meth)acrylate and hydroxybutyl (meth)acrylate.

18. The modified polyaspartic acid ester according to claim 1, wherein the monomer having at least one hydroxyl group is contained in an amount of from 1 to 40% by weight per 100% by weight based on the total weight of monomers in the shell layer.

19. The curable resin composition according to claim 6, wherein the monomer having at least one hydroxyl group is at least one of hydroxyethyl (meth)acrylate and hydroxybutyl (meth)acrylate.

20. The curable resin composition according to claim 6, wherein the monomer having at least one hydroxyl group is contained in an amount of from 1 to 40% by weight per 100% by weight based on the total weight of monomers in the shell layer.

* * * * *